United States Patent [19]

Ohnuki et al.

[11] Patent Number: 4,969,003
[45] Date of Patent: Nov. 6, 1990

[54] AUTOFOCUS DEVICE

[75] Inventors: Ichiro Ohnuki; Akira Akashi; Terutake Kadohara; Masaki Higashihara, all of Kanagawa, Japan

[73] Assignee: Canon Kabushiki Kaisha, Tokyo, Japan

[21] Appl. No.: 349,532

[22] Filed: May 5, 1989

[30] Foreign Application Priority Data

May 13, 1988 [JP] Japan .................................. 63-116451

[51] Int. Cl.$^5$ .......................... G03B 13/36; G02B 7/28
[52] U.S. Cl. .................................. 354/402; 250/201.2
[58] Field of Search ....................... 354/402; 250/201.2

[56] References Cited

U.S. PATENT DOCUMENTS 4,816,856 3/1989 Hamada et al. ...................... 354/402

Primary Examiner—W. B. Perkey
Attorney, Agent, or Firm—Fitzpatrick, Cella, Harper & Scinto

[57] ABSTRACT

An auto-focus device or a camera equipped with such a device includes a focus detecting circuit for repeatedly detecting focus, in which an image forming optical system is driven on the basis of the focusing quantity detected by the focus detecting circuit. A speed computing circuit is provided for computing a speed of movement of an image plane corresponding to movement of the object on the basis of past autofocusing operation data. A drive data computing circuit is provided for predictive-computing data relating to a drive position of the image forming optical system, considering the movement of the object, on the basis of the past autofocusing operation data. A speed control circuit is provided for controlling a driving speed of the image forming optical system on the basis of the speed obtained by the speed computing circuit. A drive circuit is provided for driving the image forming optical system in one of a first mode in which a drive position of the optical system is controlled in accordance with data obtained by the drive data computing circuit without actuating the speed control circuit, and a second mode in which a driving speed of the optical system is controlled by the speed control circuit without actuating the drive position of the optical system using the drive data computing circuit. Finally, a selection circuit is provided for selecting between the first and second modes.

9 Claims, 16 Drawing Sheets

AUTOFOCUS DEVICE

BACKGROUND OF THE INVENTION

1. Field of the Invention

This invention relates to an automatic focusing device for use in camera; or the like.

2. Description of the Related Art

To continue adjusting an objective lens to focus on a moving object to be photographed by the autofocus system while tracking the moving object, the chance of focus error attributable to the motion of the object must be reduced by compensating for the tracking lag. For this purpose, a prediction method can be considered in which the behavior of a plane of the sharp image of the object is approximated to a quadratic function or a linear function to predict the position which the image plane will take in the near future.

In an autofocus device employing this prediction method, however, despite a smooth change of the position of the (sharp) image plane as is usual, the focus detection and the lens adjustment are made to be alternatively repeated. Hence, the lens moves stepwise. For this reason, a discrepancy between the predicted and actually adjusted positions of the image plane is caused to differ by an amount which change's, as the automatic focus adjusting operation is repeated, depending on a point in the step of movement of the lens at which the focus adjusting operation is shifted to a releasing operation.

To eliminate this drawback, when a camera release is actuated at a point during the repetition of the automatic focus adjusting operation to produce a release start signal, the predicted position of the sharp focus is revised be calculating it again from the past focus adjustment result suit to the time of running of the shutter curtain. After the lens has been adjusted in accordance with the result of that calculation, the shift to the releasing operation is allowed to take place. Thereby, the focus error due to the aforesaid discrepancy is prevented from occurring. The use of this method, however, leads to an increase in time from the moment at which the release start signal has been produced to the moment at which the shutter curtain starts to run, that is, the so-called release time lag. Therefore, the possibility of missing good shutter chances will become high.

Further, in the above-described two methods, the lens repeats the start and stop of movement. This is accompanied with such problems that very frequent shocks are given to the camera and the driving of the lens produces noise, by which the feel of camera use is extremely damaged.

Meanwhile, the other method of keeping the in-focus state stable against the motion of the object is disclosed in Japanese Laid-Open Patent Applications Nos. Sho 62-253107 and 63-5316. In these publications, there is disclosed a technique that as the object is moving, when a tracking lag occurs, the adjustment of the lens is corrected in such a way as to reduce that lag, in which while carrying out the driving of the lens, storage of light (=electric charge) on a focus detecting sensor and computation of the corrected position of the lens are performed. However, this prior known technique does not suggest a positive correction such that the position which the image plane of sharp focus will take in the future is predicted, but is based on the idea of curbing the rise of the tracking lag. So, it will be safe to say that the much-desired improvement of the stability of the in-focus state cannot be expected.

SUMMARY OF THE INVENTION

With the foregoing in mind, one aspect of the present invention to provide an autofocus device in which a speed at which an image plane of an object to be photographed will move in a predetermined time is obtained by prediction from a plurality of past focus detection results, and the lens is driven on the basis of this speed.

Another aspect of the present invention concomitant with the above-described object is to provide an autofocus device in which a position at which an image plane of an object to be photographed will take in a predetermined time is obtained by predictive computation from a plurality of past focus detection results, and a speed of movement of the image plane is computed from this predicted value.

A further aspect of the present invention is to provide an autofocus device having a mode of the aforesaid predictive computation of the speed and a mode of the aforesaid predictive computation of the position of the image plane after the predetermined time, wherein the position, or the speed of movement, of the lens is controlled by a selected one of the aforesaid modes.

Other objects of the invention will become apparent from the description of an embodiment thereof with reference to the drawings.

DETAILED DESCRIPTION OF THE PREFERRED EMBODIMENTS

At first, using FIG. 1, the lens drive control method of the invention will be explained. In the figure, the abscissa represents time "t", and the ordinate represents the position "d" of an image plane of an object to be photographed.

A curve f(t) shown by a solid line represents that, with the index on the distance ring of the photographic lens being at a position in registry with a mark for infinity, when an object to be photographed is approaching the camera in axial alignment, the position "d" of the image plane varies as the time "t" passes. And, the distance between the abscissa and the curve f(t) represents ever-changing defocus quantities on the assumption that the lens is held stationary in that position. To eliminate the aforesaid defocus quantity, the photographic lens is moved to shift the plane of sharp focus over the position of the abscissa to a position at a polygonal line l(t) shown by broken lines. After the lens has thus teen driven, therefore, the difference between the values of f(t) and l(t) at the same time "t", or between the ideal and actual positions d of the plane of sharp focus shown by f(t) and l(t) respectively in the direction of the ordinate, signifies the defocus quantity obtained after the lens driving.

Incidentally, in the following discussion, for the purpose of convenience, (t) is called the "lens position".

It is stipulated here that each cycle of focus detecting operation starts at a time ti, wherein this time coincides with the start time of storage of electric charges on the focus detecting sensor, yet the storage period is assumed to be very short so that it is almost instantaneously completed at the time ti, and this is followed by computation which terminates at a time ti', that is, the cycle of focus detecting operation terminates at the time ti'. The object image in the form of electric charges stored at the time it has a defocus quantity DFi. The lens is driven in accordance with the aforesaid focus detection and the result of a computation to be described later so that the image plane is shifted a distance DLi. In other words, the amount of movement of the lens is translated to this distance DLi. TLi represents a period for which the lens is driven. TMi represents a period of on a cycle necessary to perform the focus detecting operation and the lens driving operation. And, fi and ti represent respectively the position of the image plane and the lens position at the time ti.

Figure 1:
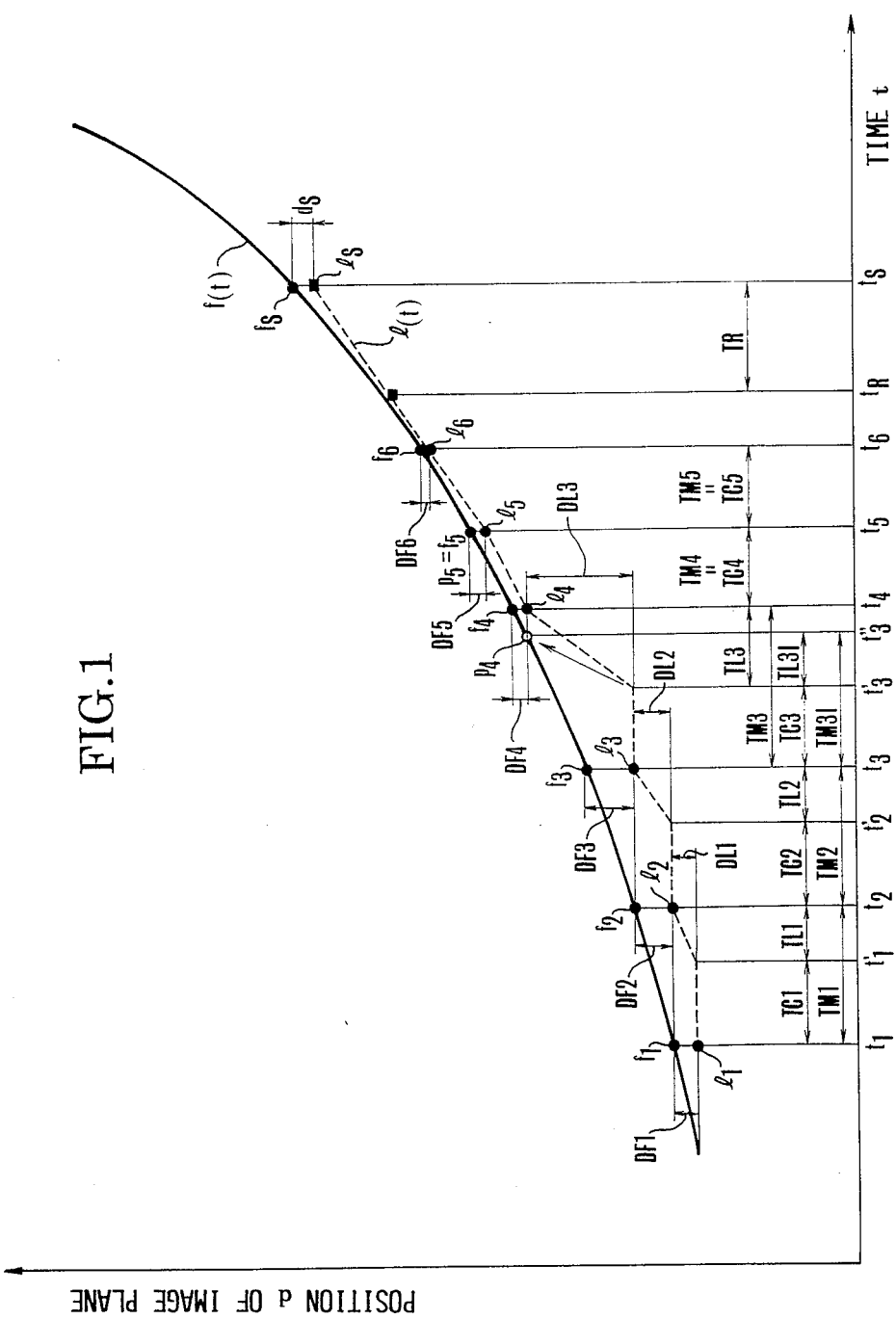
FIG. 1 is a diagram for explaining the principle of the focus adjusting device of the invention.

In the example shown in FIG. 1, it is assumed that the image plane of the object to be photographed varies according to a quadratic function. That is, for three given samples of the position of the image plane, say, $(t_1, f_1)$, $(t_2, f_2)$ and $(t_3, f_3)$, the only one quadratic function curve that passes these three points is defined. With this help, it is possible at a time $t_3'$ at which that computation is completed to predict the position $p_4$ which the image plane, after a period TL3I, will take at a time $t_3''$.

Under such an assumption, a process for defining the predictive function is first described. At first, the focus detecting system usually employed in the single-lens reflex camera cannot sense the positions $f_1$, $f_2$ and $f_3$ of the image plane, but can sense the defocus quantities DF1, DF2 and DF3 and the distances DL1 and DL2 which the lens has moved and which can be translated to the shifts of the image plane. It is also assumed that the predicted value TL3I of the lens driving period is equal to the previous value TL2.

Next, the function f(t) for the position of the image plane of the object is expressed as follows:

$$at^2 + bt + c = f(t) \quad (1)$$

By substituting the data of the image plane obtained at three different times for the coordinates of the function (1), $$at_1^2 + bt_1 + c = f_1 \quad (2)$$

$$at_2^2 + bt_2 + c = f_2 \quad (2)'$$

$$at_3^2 + bt_3 + c = f_3 \quad (2)''$$

are obtained. And, considering a point $l_1$ in FIG. 1 as the original point, ti and fi are expressed as follows:

$$\begin{aligned} f_1 &= DF1 \\ f_2 &= DF2 + DL1 \\ f_3 &= DF3 + DL2 + DL1 \end{aligned} \quad (3)$$

$$\begin{aligned} t_1 &= 0 \\ t_2 &= TC1 + TL1 \\ t_3 &= TC1 + TL1 + TC2 + TL2 \end{aligned} \quad (4)$$

Substituting the equations (3) and (4) for the coordinates of the functions (2), (2)' and (2)'' and rearrangement give equations for the constants "a", "b" and "c":

$$a = (DF3 + DL2 - DF2)/(TC1 + TL1 + TC2 + TL2) \cdot \quad (5)$$
$$(TC2 + TL2) + (DF1 - DL1 - DF2)/(TC1 + TL1 +$$
$$TC2 + TL2) \cdot (TC1 + TL1)$$

$$b = (DF2 + DL1 - DF1 - a(TC1 + TL1)^2)/(TC1 + TL1) \quad (6)$$

$$c = DF1 \quad (7)$$

This process of computation establishes the definition of a predictive function f(t) for determining the position of the image plane depending on the speed of a moving object. But, since the result of prediction by this function appears at an intermediate point in the third cycle of focus adjusting operation, or at the termination $t_3'$ of the third focus detecting operation, it is from here that the position of the point $p_4$ is predicted. Letting the expected period of moving the lens from the time $t_3'$ to a time at which the lens reaches the position $p_4$ be denoted by TL3I, an equation for the necessary amount of movement DL3 of the lens is as follows:

$$\begin{aligned} DL3 &= p_4 - l_3 \\ &= p_4 - (f_3 - DF3) \\ &= a \cdot TT3^2 + b \cdot TT3 + c - (a \cdot TT2^2 + \\ & \quad b \cdot TT2 + c) + DF3 \\ &= a \cdot (TT3^2 - TT2^2) + b \cdot (TC3 + TL3I) + DF3 \end{aligned} \quad (8)$$

where $$\begin{aligned} TT3 &= T_3'' - t_1 \\ &= TC1 + TL1 + TC2 + TL2 + TC3 + TL3I \end{aligned} \quad (9)$$

$$\begin{aligned} TT2 &= t_3 - t_1 \\ &= TC1 + TL1 + TC2 + TL2 \\ &= TM1 + TM2 \end{aligned} \quad (10)$$

Hence, the driving of the lens in accordance with the amount of movement DL3 obtained by the equation (8) brings the image plane of the object into coincidence with the position of the lens at the time $t_3''$. Thus, the defocus quantity is reduced to zero. In short, such a procedure can, in principle, establish coincidence of the actual position of the image plane with the ideal one.

It should be pointed out in connection with FIG. 1 that for better understanding of the method of correcting the tracking error as will be described later, the depiction is made intentionally so that a prediction error arises. In more detail, though, in the foregoing discussion, the expected period TL3I of moving the lens is assumed to be equal to the normal period TL2, so that the lens is capable of reaching the point $p_4$ at the time $t_3''$, it is in actual practice that because the present amount of movement DL3 of the lens is considerably greater than the previous amount of movement DL2 of the lens, the period TL3 it would actually take to move the lens to the point $p_4$ would get longer than the theoretically expected period TL3I of moving the lens to the same point $p_4$. Under such a circumstance, the driving of the lens by the amount of movement DL3 is completed at a time $t_4$. The position for the image plane, on the other hand, when in the time $t_4$, does not lie at the point $p_4$ but is shifted to a point $f_4$. At the time $t_4$, therefore, the defocus quantity DF4 becomes:

$$DF4 = f_4 - l_4 \tag{11}$$

Thus, somewhat tracking lag is still left uncorrected.

The foregoing has been devoted to the process for correcting the movement of the lens until the time $t_4$. Next an explanation will be given of a process for moving the lens after the time $t_4$. Now suppose the lens takes the position $p_4:l_4$ in the above-described course at the time $t_4$. Since, even from the time $t_4$ onward, the position of the image plane continues shifting, there is then a need to cause the lens, too, to track it at any time. While the position of the image plane has been defined by the function f(t) in the form of the equation (1), now by differentiating this, the following equation is obtained:

$$df(t)/dt = 2a \cdot t + b = v(t) \tag{12}$$

Thus, a function v(t) for the speed at which the image plane shifts as the object is moving, is defined. Therefore, after the lens has been driven toward the point $p_4$ by the amount DL3, if it continues being driven at a speed defined by $$\begin{aligned} v(t_3'') &= 2a \cdot (t_3'' - t_1) + b \\ &= 2a \cdot TT3 + b \end{aligned} \tag{13}$$

it then becomes possible to track the moving object without production of a focus error.

Meanwhile, because at the time $t_4$ there remains the aforesaid tracking lag DF4, if, for the period that follows the time $t_4$, the lens is driven in accordance with the speed obtained by correcting that calculated on the basis of the formula (13) by an amount corresponding to the tracking lag DF4, a better result will be obtained. But, the result of computation of the tracking lag DF4 appears at a time $t_5$. So, it is only after the time $t_5$ that the computation result of the tracking lag DF4 can be fed back to the control of the driving of the lens. Hence, an opportunity for controlling the driving of the lens in accordance with the speed corrected by the tracking lag DF4 occurs after the time $t_5$.

Now, from the time $t_4$ onward, while driving the lens at a speed corresponding to the speed $v(t_3'')$, the focus detecting operation is carried out. At the time $t_5$, the defocus quantity that has been sensed at the time $t_4$ is calculated. Further, using the data obtained at points $f_2$, $f_3$ and $f_4$, the position $p_5$ the image plane is predicted to take at the time $t_5$ and the moving speed $v_5$ of the image plane are calculated. Incidentally, since, after the time $t_4$, all that affects the control of the lens is only the speed, there is no need to calculate the point $p_5$. The process for calculating the speed $v_5$ is described below.

At first, from the data about the points $f_2$, $f_3$ and $f_4$, the function l(t) has to be redefined. For this purpose, by using the data on the periods TC2, TL2, TC3 and TL3, the data on the defocus quantities DF2, DF3 and DF4 and the data on the lens driving amounts DL2 and DL3, and on the basis of formulae similar to (5) to (7), the constants "a", "b" and "c" of the function f(t) are defined. Incidentally, in this case, the computations are performed with the lens position $l_2$ taken as the original point.

From the equations (12) and (13), the speed $v_5$ is then obtained as follows:

$$\begin{aligned} v_5 &= 2a \cdot (t_5 - t_2) + b \\ &= 2a \cdot (TC2 + TL2 + TC3 + TL3 + TC4) + b \end{aligned} \tag{14}$$

Next, the speed correction factor $\Delta v_4$ due to the residual tracking lag DF4 is taken into account. To remove the lag DF4 in one cycle of focus detection, the speed correction factor rust take a value expressed by $$\Delta v_4 = DF4/TC5 \tag{15}$$

Therefore, from the time $t_5$ onward, by adding the equations (14) and (15), the lens is driven at the following speed $v_5'$:

$$\begin{aligned} v_5' &= v_5 + \Delta v_4 \\ &= 2a(TC2 + TL2 + TC3 + TL3 + TC4) + \\ &\quad b + (DF4/TC5) \end{aligned} \tag{16}$$

Hence, the tracking lag DF4 that has occurred at the time $t_4$ is recognized at the time $t_5$, and the correction is completed at a time $t_6$. It should be noted that because the speed of driving of the lens in one cycle of focus detection remains constant, a focus error DF6 is left uncorrected even at the time $t_6$. But its magnitude is very small. It will be appreciated from this that the method of the invention has a high efficiency.

The combined process is summed up in a sequence of the above-described cycles of focus detection.

At a time $t_1$, first cycle of focus detection begins with the start of a first operation or the sensor storage. The defocus quantity DF1 is computed and the result is provided at the time $t_1'$. Then, the lens is driven and stopped with the resultant amount of movement DL1. From a time $t_2$, a second cycle of focus detection is likewise started. The defocus quantity DF2 is found at the time $t_2'$. Based on this, the lens is again driven and stopped with the resultant amount of movement DL2. From a time $t_3$, a third cycle of focus detection is started. The defocus quantity DF3 is then computed. From the thus found data about the points $f_1$, $f_2$ and $f_3$, a particular form of the function f(t) is defined. With this, 1 he position $p_4$ at which the image plane of an object to be photographed will take at the time $t_3''$ of the termination of the next driving of the lens is determined. In prospect of this, the required amount of movement DL3 and the associated moving speed $v_4$ of the image plane at the position $p_4$ of the image plane are calculated. This calculation is completed at the time $t_3$.

At the same time, the lens starts to be driven for the amount DL3. At a time $t_4$, the lens has been driven by that amount. It is here that the position control mode is shifted to the speed control mode. Hence the lens continues being driven at the speed corresponding to the speed $v_4$. And, at the same time or $t_4$, a fourth cycle of focus detection is started. In this cycle, based on the data about the points $f_2$, $f_3$ and $f_4$, both the moving speed of the image plane at the time $t_5$ and the speed correction on factor which depends on the defocus quantity DF4 are calculated to obtain a speed of movement $v_5'$ of the lens for the period beginning at the time $t_4$ (or from the time $t_5$ to the start of the next cycle of focus detection.)

And, at the time $t_5$, the speed of movement of the lens is changed to and maintained at the value $v_5'$, and the focus detection enters the fifth cycle. At the termination of the fifth cycle, the data about the points $f_3$, $f_4$ and $f_5$ are selected as the samples for use in calculating the moving speed for the next cycle of focus detection beginning with the time $t_6$.

In such a manner, it is after the autofocus device is switched to the speed control mode that the speed at which the lens is to be driven during the next cycle of focus detection is determined by using a plurality of the latest ones of the data obtained in the past until just before entering that cycle. Thus, the lens is continuously and repeatedly driven at the speed renewed in each cycle of focus detection.

Now assuming that a release actuating member is pushed to produce a release start signal at a time $t_R$ during the repetition of the above-described object-tracking and focus-adjusting operation, then the camera responsive to this starts to operate, so that the mirror moves upward, the diaphragm is closed down to the presetting, and then the shutter is released. From the time $t_R$ onward, the driving speed of the lens is unchanged from the value it has so far taken. In a release time lag TR or at a time $t_S$, the shutter starts to open. The position of the image plane and the position of the lens at this time are located at $f_S$ and $l_S$ respectively. Hence, $d_S = f_S - l_S$ measures the defocus quantity. However, this focus error is far smaller than would be when the above-described tracking error is not corrected. Another advantage arising from the continuous driving of the lens without redundant repetition of stoppages is that the focus adjustment is carried out smoothly and shocks also are few. In other words, the use of the above-described principle of the invention makes it possible that for a moving object, no unpleasant impression is given to the photographer while still permitting even the beginner to take photographs of high quality in respect to the focusing accuracy.

Figure 2:
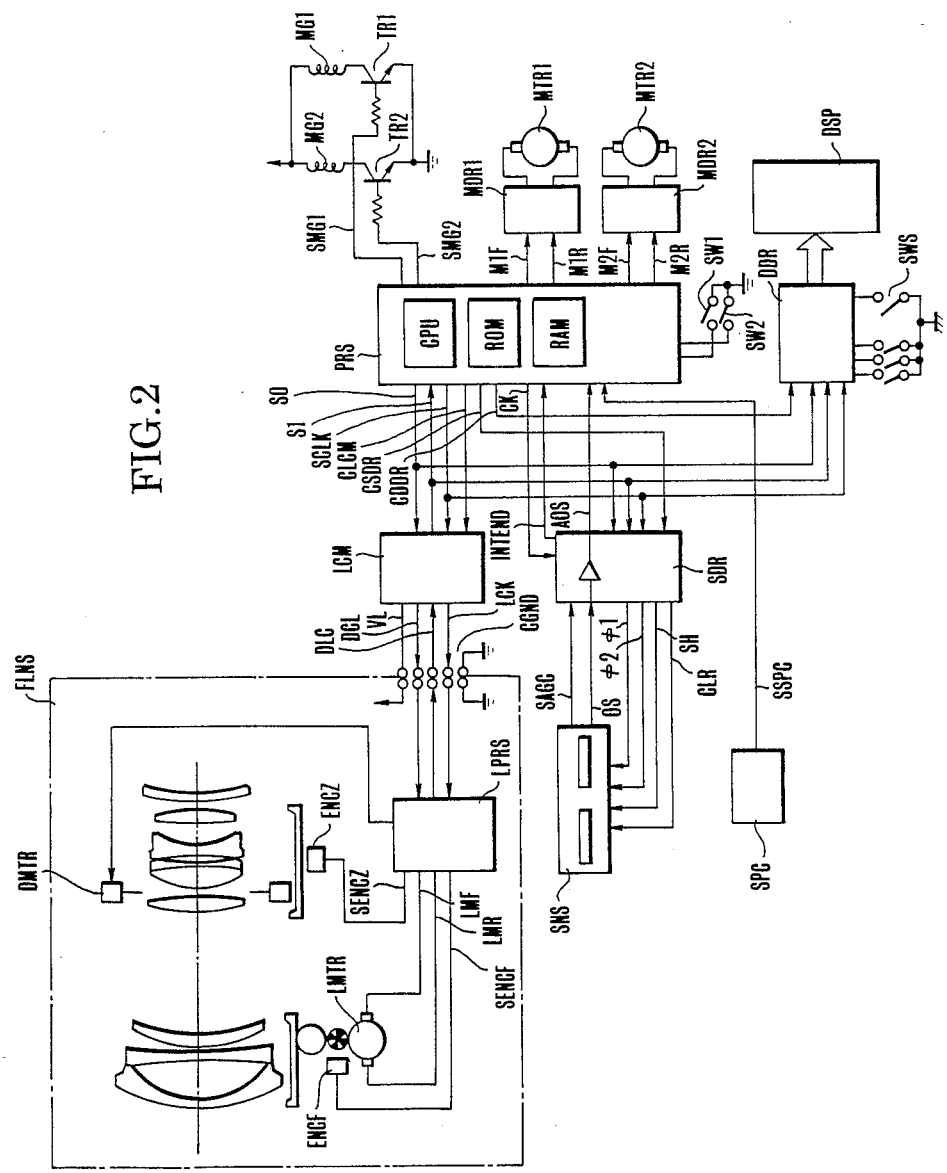
FIG. 2 is an electrical circuit diagram illustrating an embodiment of the focus adjusting device according to the invention.

Next, a practical example of a camera equipped with the autofocus device whose focus adjustment is based on the above-described principle of the invention is described below. FIG. 2 shows an example of the electrical circuitry of this camera.

In FIG. 2, a control device PRS for the camera is, for example, in the form of a one-chip microcomputer having built therein a central processing unit (CPU), ROM, RAM and an A/D converter. According to the program for the sequence of operations of the camera stored in the ROM, the computer PRS performs the automatic exposure control function, the automatic focus detecting function, the film winding function and others of the camera in sequence. For this purpose, the computer PRS uses signals SO, SI and SCLK for synchronous communication, and signals CLCM, CSDR and CDDR for selecting communication lines in controlling the coordination of the peripheral circuits in the interior of the camera body and the circuits in the lens casing.

The data signal SO is output through an outgoing data bus from the computer PRS, and the data signal SI is input through an incoming data bus to the computer PRS. The signals SO and SI are synchronized by the synchronizing clock SCLK.

A buffer circuit LCM for communication with the lens, when the camera is in operation, supplies electric power to electrical power source terminals for the lens and, when the selection signal CLCM output from the computer PRS is at high potential level (hereinafter abbreviated to "H"), functions as a buffer in the communication between the camera body and the lens.

The computer P(S, while setting the signal CLCM to "H", sends out prescribed data in the form of the signal SO in synchronism with the signal SCLK. Then, the buffer circuit LCM accepts the signals SCLK and SO and produces their buffered signals LCK and DCL respectively which are output to the lens through the contact points between the camera body and the lens. At the same time as this, it accepts a signal DLC from the lens and produces item buffered signal as the signal SI. The computer PRS, on the other hand, receives, in synchronism with the signal SCLK, the data of the lens as carried on the signal SI.

A line sensor device SNS for focus detection is constructed with inclusion of a CCD. A drive circuit SDR for the sensor SNS is rendered operative when the signal CSDR is "H", so that it is controlled by the computer PRS by using the signals SO, SI and SCLK.

A clock signal CK is used to form CCD drive clocks $\phi 1$ and $\phi 2$. A signal INTEND informs the computer PRS of the fact that the storage operation has ended.

The sensor device SNS produces an output signal OS in the form of time-serial image signals synchronized with the clocks $\phi 1$ and $\phi 2$, which, after having been amplified in passing through an amplifier circuit in the drive circuit SDR, is supplied as a signal AOS to the computer PRS. The computer PRS receives the signal AOS at an analog input terminal thereof and then converts it to digital form by the internal A/D conversion function in synchronism with the signal CK. The thus treated image signals are then stored in respective prescribed addresses of the RAM successively.

The sensor device SNS further includes another sensor for automatic gain control AGC to produce an output signal SAGC which is supplied to the drive circuit SDR. In turn, the signal SAGC is used to control the storage operation of the sensor device SNS.

A light measuring sensor SPC for exposure control is positioned to receive light coming from an object to be photographed and entering through the photographic lens. Its output SSPC is supplied to an analog input terminal of the computer PRS and, after the A/D conversion, is used in the automatic exposure control (AE) according to a prescribed program.

A switch sensing and display circuit DDR, when the signal CCDR is "H", is selected to be controlled by the computer PRS by using the signals SO, SI and SCLK. That is, depending on the data sent from the computer PRS, it changes over displays of a display member DSP of the camera. Its other capability is to inform the computer PRS of the on- or off-states of the various actuating members on the camera housing.

Switches SW1 and SW2 cooperate with a release button (not shown) in such a way that when the release button is pushed to a first stroke, the switch SW1 turns on. Upon further depression of the release button to a second stroke, the switch SW2 turns on. The computer PRS, as will more fully be described later, responsive to closure of the switch SW1 performs a light measuring and automatic focus adjusting operation, and takes the closure of the switch SW2 as a trigger for the exposure control and the winding-up of the film that follows the exposure. Incidentally, the switch SW2 is connected to an interrupt input terminal of the microcomputer PRS. Therefore, despite the progress of executing the program for the closed switch SW1, an interruption can occur a& any time when the switch SW2 turns on, being followed immediately by a transfer to a prescribed interruption program.

An electric reversible motor MTR1 for film transport and another reversible motor MTR2 for up- and down-movement of the mirror and the power charging of the shutter spring are controlled by the respective drive circuits MDR1 and MDR2 to change over between the forward and reverse directions of rotation depending on motor control signals M1F, M1R, M2F and M2R supplied from the microcomputer PRS to the drive circuits MDR1 and MDR2.

Electromagnets MG1 and MG2 control the start of running of the leading and trailing shutter curtains respectively. They are energized by amplifying transistors TR1 and TR2 in response to signals SMG1 and SMG2, when the computer PRS controls the exposure time.

The switch sensing and display circuit DDR, the motor drive circuits MDR1 and MDR2 and the shutter control circuit are not essential to the invention. Therefore, no more detailed explanation is given here.

A signal DCL is supplied to a control circuit LPRS in the lens casing in synchronism with the signal LCK, being data of commands from the camera body to the lens FLNS. For any given command, the manner in which the lens FLNS operates is previously determined.

The control circuit LPRS analyzes that command according to the prescribed procedure and performs focus adjustment, setting of the diaphragm, and produces outputs representing the states cf the various mechanisms (how long the focus adjusting optical system has moved, what number of steps the diaphragm is closed down, etc.) and the values of parameters (the full-aperture F-number, the focal length, the coefficient of a variable of defocus quantity versus focusing movement, etc.).

In the illustrated embodiment, an example of the zoom lens is shown. In a case where a command for focus adjustment is sent from the camera, signals LMF and LMR representing respectively the amount and direction of movement or the amount and speed of movement are simultaneously sent to drive a motor LMTR for focus adjustment, thereby axially moving the optical system to effect focusing. The distance that the optical system has moved is monitored by a pulse signal SENCF output from an encoder circuit INCF. As a counter in the control circuit LPRS is counting the pulses, when the distance reaches a predetermined value, the control circuit LPRS itself changes the signals LMF and LMR to low level or "L" at which the motor LMTR is braked.

For this reason, after the command for focus adjustment has once been sent from the camera, the computer PRS in the camera does not need to participate in the movement of the lens at all. It is also to be noted that the control circuit LPRS is arranged to be able to send the content of the aforesaid counter to the camera as necessity arises.

In a case where a command for diaphragm control is sent from the camera, a signal representing the number of steps which the diaphragm must be closed down is simultaneously sent. By this signal, a publicly known stepping motor DMTR is driven to adjust the diaphragm to the setting. Because the stepping motor is capable of open control, no encoder for monitoring the action is required.

An encoder circuit ENCZ is adapted to the zoom optical system. On receipt of a signal SENCZ from the encoder ENCZ, the control circuit LPRS detects the zooming position. Since the values of the focal length as a parameter corresponding to all the zooming positions are stored in a memory of the control circuit LPRS, whenever the camera computer PRS makes a request, one of the values of the parameter corresponding to the present zooming position is sent to the camera.

Figure 3:
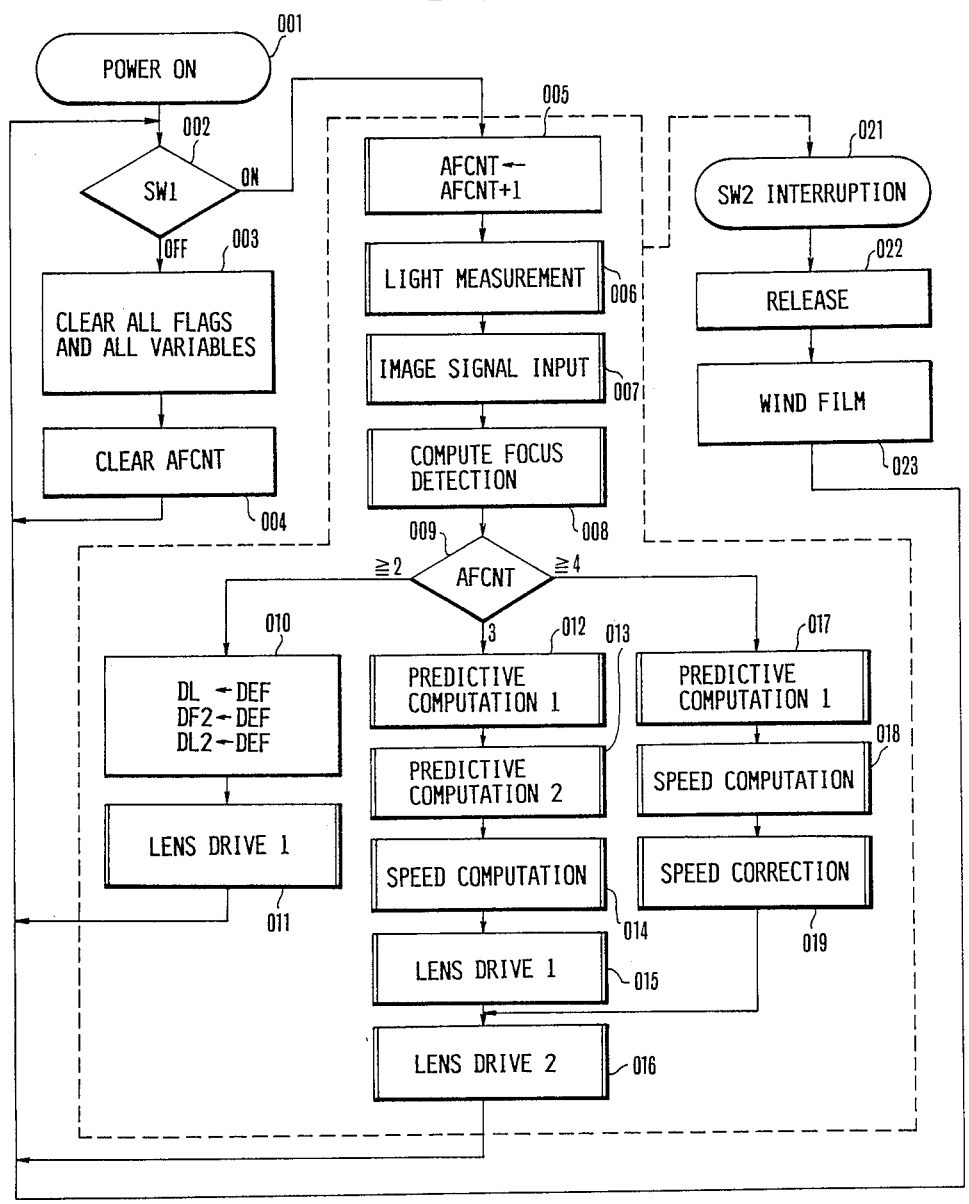
FIG. 3 is a flowchart for control of the focus adjusting device of the invention.

The operation of the camera of such construction is described according to the flowcharts beginning with FIG. 3.

When an electric power source switch (not shown) is turned on, a current supply to the microcomputer PRS is started. So the computer PRS starts to execute the sequence program stored in the ROM.

FIG. 3 is a flowchart illustrating a main flow of the aforesaid program. By the aforesaid actuation, the execution of the program begins with the start step 001. The state of the switch SW1 that turns on in response to depression of the release button to the first stroke is sensed in a step 002. If the switch SW1 is off, the flow proceeds to a step 003, where the computer PRS is initialized by clearing its RAM of all the previously set values of the control flags and variables. In the next step 004, a counter AFCNT for counting the number of cycles of focus detection is cleared. This procedure of the stops 002 to 004 repeats itself until the electric power source turns off. By turning-on of the switch SW1, the flow advances from the step 002 to a step 005.

In the step 005, as a new focus detecting operation is started by row, the content of the counter AFCNT is incremented one to count the number of performed cycles of focus detection.

In a step 006, to control the exposure, a "light measurement" subroutine is executed. In this "light measurement" subroutine, the computer PRS receptive of the output SSPC of the sensor SPC for light measurement at its analog input terminal converts it to digital form, then computes this digital light value with the preset values of other exposure factors to obtain an optimum exposure value, i.e. shutter control value, aperture control value, and then transfers and stores them at the prescribed addresses in the RAM. And, at the time of release actuation, the shutter time and the aperture size are controlled in accordance with these values.

Figure 4:
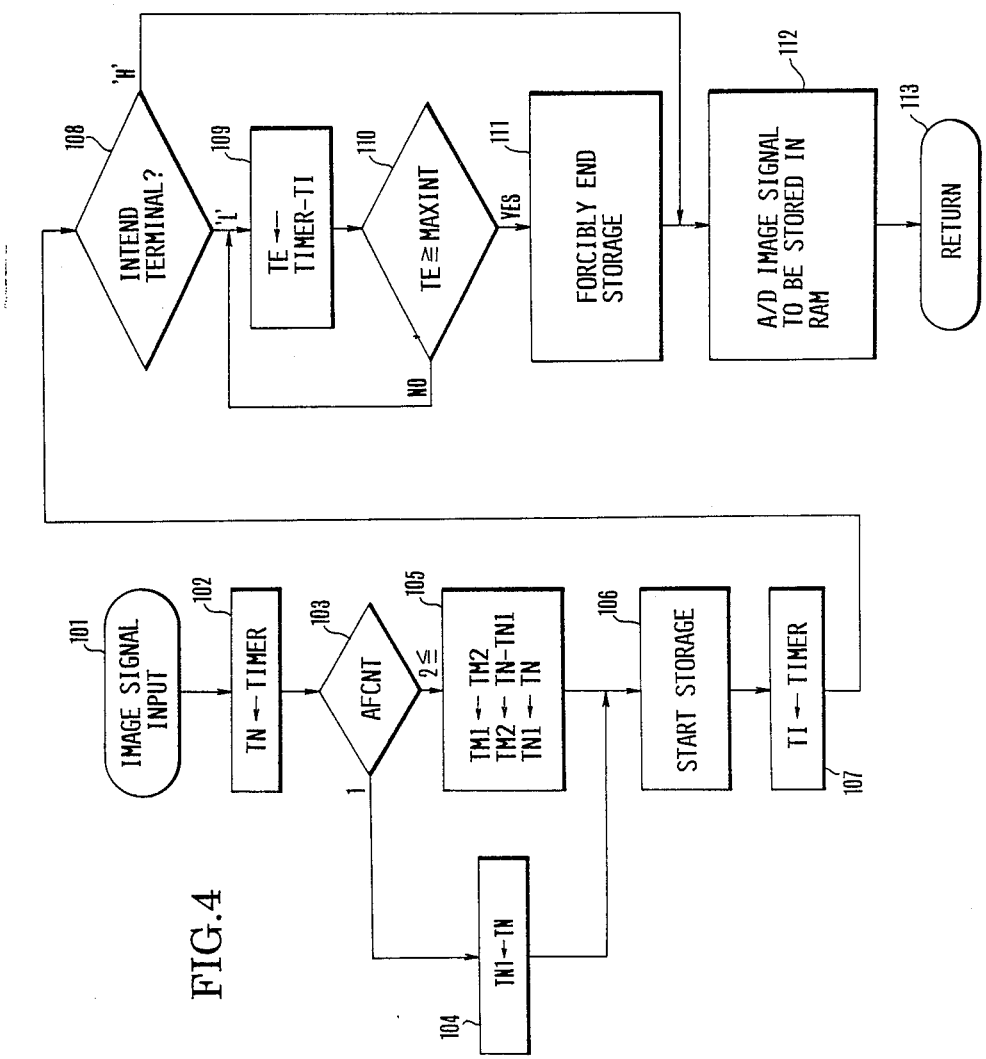
FIG. 4 is a flowchart for the image signal input subroutine in FIG. 3.

Subsequently, in "image signal input" subroutine is executed in a step 007. The flow of this subroutine is shown in FIG. 4, where, the computer PRS accepts input of the image signals from the sensor device SNS for focus detection. The details will be described later.

In the next step 008, based on the received image signals, the defocus quantity DEF of the photographic lens is computed.

In a step 009, the content of the counter AFCNT is sensed. If AFCNT=1 or 2, it is still impossible to perform the predictive computation. Therefore, the value of the defocus quantity calculated in the step 008 is translated directly to the required amount of driving DL of the lens. Because the thus sampled values of the variables DEF and DL must be stored as the data for the predictive computation, they are stored in the memories DE2 and DL2. Concerning the updating of the data, an explanation will be given made in connection with a step 012 too.

In a "lens drive 1" subroutine of a step 011, the driving of the lens is carried out based on the amount of driving DL of the lens defined in the step 010. In order to cover the desired amount of driving in as a time as possible while preserving good accuracy of position control, a suitable program is written and built into the control circuit LPRS, according to which the distance is translated to a value of acceleration or deceleration. The lens drive control method adapted to such a purpose is, for example, to alter the voltage across the ends of winding of the motor LMTR according to the built-in program, or is obtained by changing the duty ratio of current supply. Since these techniques belong to the prior art, no more detailed explanation is given here.

On completion of the lens driving by the subroutine of the step 011, the flow returns to the step 002. If the switch SW1 is on, then the next cycle of focus detection is started.

In a step 009, when the series of the above-described programs has been executed 3 times to set AFCNT=3, because three samples of data of the focus detection have been obtained, it becomes possible to perform a predictive computation, and the flow proceeds to a step 012.

A "predictive computation 1" subroutine of the step 012 is used to calculate the constants "a", "b" and "c" of the function f(t) for the position of the image plane according to the above-mentioned formulae (5) to (7) And, after the step 012 has been executed, the flow advances to a step 013.

A "predictive computation 2" subroutine is used to predict the future position of the image plane according to the above-mentioned formula (8) and to calculate the lens driving amount DL3 as the result of the prediction. After the execution of the step 003, the flow advances to a step 014.

A "speed computation" subroutine of the step 014 is used to calculate the lens driving speed v according to the above-mentioned formula (13). After the execution of the step 014, the flow, advances to a step 015.

The step 015 has the same subroutine as the step 011. The lens is adjusted in accordance with the lens driving amount DL3 calculated in the step 013. After the driving of the lens by the amount DL3 has been completed, the lens stops. The flow then advances to a step 016.

A "lens drive 2" subroutine of the step 016 is used to drive the lens at a speed corresponding to the speed v calculated in the step 014. Thus, the voltage applied to the motor LMTR or the current supply duty is controlled by the control circuit LPRS while monitoring the driving speed by the encoder circuit ENCF in the lens casing, so that the lens is driven at the designated speed. Concerning the driving under the constant speed control, the publicly, known methods may be used. Therefore, no more detailed explanation is given here. It should be noted in this subroutine that after a value of the speed has once been indicated, the speed of driving of the lens is kept at that value until the next command for speed alteration or stoppage comes. After the execution of the step 016, the flow returns to the step 002. If the switch SW1 remains on, the next cycle of focus detection succeeds If, in the step 009, AFCNT≧4, because it corresponds to the cycle performed after the time $t_4$ in FIG. 1, the feedback of the tracking lag DF4 becomes necessary. Therefore, as first in a step 017, similarly to the step 012, the constants "a", "b" and "c" of the function f(t) are calculated. Then in a step 018, similarly to the step 01, the driving speed v is calculated. The flow then advances to the step 019.

A "speed correction" subroutine of the step 019 is used to calculate the speed correction factor Δv according to the above-mentioned formula (15) and to add it to the result of the computation of the step 018. The flow then advances to the step 016.

In the step 016, if the lens stop command has not come until now, the lens continues being driven at the speed designated in the previous cycle. And, when a new value of the speed calculated in the step 019 is received, the lens is driven immediately by that new speed. As soon as the speed has altered, the flow returns to the step 002. Subsequently, the steps 002, 005 to 009, 017 to 019 and 016 are repeated when the driving of the lens is controlled. Thus, the camera is tracking the moving object under the condition that the lens position and the image plane position are in coincidence, as has been described in connection with FIG. 1.

A case where, as the switch SW2 has turned on in the middle of the course of adjusting the lens in the above-described procedure, a release interruption has occurred is explained below. The switch SW2, as has been described above is connected to the interruption input terminal of the computer PRS, and is arranged so that when the switch SW2 turns on, regardless of whatever step is being executed, the flow immediately transfers to a step 021 by the interruption function. Hence, the actuation of a camera release is followed by the advance of the flow to the step 021 and then to a step 022 for a "release" subroutine. In here, a sequence of operations of the camera, namely, the release operation and the exposure operation and further an operation of stopping the motor from moving and keeping it stationary during the exposure, are carried out. And after the termination of the exposure, the fill is wound in a step 023. This is performed by controlling the motor control signals M1F and M1R of FIG. 2 to wind the film by one frame. The explanation of the winding operation is omitted.

At this operation, one cycle of the shooting operation beginning with the lens driving terminates.

Next, the "image signal input" subroutine mentioned in connection with the step 007 of FIG. 3 will be explained by reference to FIG. 4. The "image signal input" subroutine is executed at the start of every new focus detecting operation. When this subroutine is called, the flow goes part the step 101 to a step 102, where a free-running timer included in the microcomputer PRS counts the present time TIMER and stores it in a memory area TN on the RAM. Thus, the time of start of the focus detecting operation is memorized.

In the next step 103, the state of the counter AFCNT is sensed. If AFCNT=1, the flow advances to a step 104, where the stored value of the memory area TN is transferred to and stored in the memory TN1. Thus, the time of the start of the first focus detecting operation is memorized is the memory TN1.

If AFCNT≧2, the flow advances to a step 105, where the focus detection intervals TM1 and TM2 are renewed. Before the execution of the step 105, the memories TM1 and TM2 have stored the values of the time intervals of the last but one and the last focus detecting operations, and the memory TN1 has stored the time at which the last cycle of focus detection has started. Accordingly, by transferring and storing the content of the memory TM2 to and in the memory TM1, the memory TM1 is renewed to the time interval of the before the last cycle. Also, the next TN-TN1 signifies the time intervals of the present and last focus detecting operations. Therefore, this is stored in the memory TM2 to renew the content of the memory TM2 to the last time interval. In final, the content of the memory TN is transferred to and stored in the memory TN1. Thus, the time of start of the present focus detecting operation is preserved until the next cycle. Incidentally, when AFCNT=2, no value is stored in the memory TM2 yet at a point in time of the operation: TM1←TM2. That is, "0" is stored. Therefore, the memory TM1, too, is set to "0". In addition, at this time: TM2←TN-TN1, the first time interval is stored.

Now, storage of an optical image in the sensor device SNS is started in the next step 106. In more detail, the computer PRS communicates with the sensor drive circuit SDR and seeds out a "storage start" command. Responsive to this, the drive circuit SDR changes the clear signal CLR of a photoelectric converting element constituting part of the sensor device SNS to "L", causing storage of electric charges to be started.

In a step 107, the timer value of the free-running timer is stored in the variable TI and the present time is memorized.

In the next step 108, the state of the input terminal INTEND of the computer PRS is sensed, or whether or not the storage has ended is examined. The sensor drive circuit SDR has a structure that it changes the signal INTEND to "L" at the same time as the start of storage and monitors the AGC signal SAGC from the sensor device SNS; and when the signal SAGC has reached a predetermined level, it changes the signal INTEND to "H" and, at the same time, changes a charge transfer signal SH to "H" and maintains it at "H" for a predetermined period, causing the electric charges of the photoelectric converting element in the CCD portion.

If, in the step 108, the potential at the terminal INTEND is "H", is it implies that the storage has been completed, the flow then advances to a step 112. If "L", as it implies that the storage is not yet completed, the flow then advances to a step 109.

In the step 109, the time TI memorized in the step 107 is subtracted from the timer value TIMER of the free-running timer and the result is stored in the variable TE. Therefore, the variable TE takes a value from the start of storage to here, i.e., the so-called storage period. In the next step 110, the variable TE is compared with a constant MAXINT. If the TE is smaller than the MAXINT, the flow returns to the step 109. Thus, the end of storage is waited for again. When the TE exceeds the MAXINT, the flow advances to a step 111, forcibly causing the storage to end. The forcible storage end is executed by sending the "storage end" command from the computer PRS to the drive circuit SDR. The drive circuit SDR, when the "storage end" command is sent from the computer PRS, change: and maintains the charge transfer signal SH to an<at "H" for a predetermined time, causing the electric charges of the photoelectric converting element to be stored in the CCD portion. Hence, by the flow up to the step 111, the storage of the sensor is completed.

In a step 112, A/D conversion of the signal AOS obtained by amplifying the image signal OS of the sensor device SNS by the sensor drive circuit SDR and storage of its digital signal in the RAM are carried out. To be described in more detail, the drive circuit SDR operates in synchronism with the clock CK output from the computer PRS to form the clocks $\phi 1$ and $\phi 2$ for driving the CCD and given them to the control circuit in the interior of the sensor device SNS. The sensor device SNS is driven at the CCD portion by the clocks $\phi 1$ and $\phi 2$ so that the electric charges in the CCD are output as an image signal time-serially from the output OS. This signal after having been amplified by an amplifier in the interior of the drive circuit SDR, is supplied as the signal A/S to the analog input terminal of the computer PRS. The computer PRS carries out A/D conversion in synchronise with the clock CK produced by itself and stores the A/D converted, digital images in prescribed addresses successively.

When the input of the image signal in such a manner has ended, the blow returns from the "image signal input" subroutine at a step 113.

Because the above-described "image signal input" subroutine, as has been described above, is called for in each focus detecting operation at its start point, the memory TM2 always stores TN-TN1, i.e., the interval of time between the last and present cycles of execution of that subroutine (the previous focus detecting operation time interval). Also, the memory TM1 always stores the before the last focus detecting operation time interval.

Figure 5:
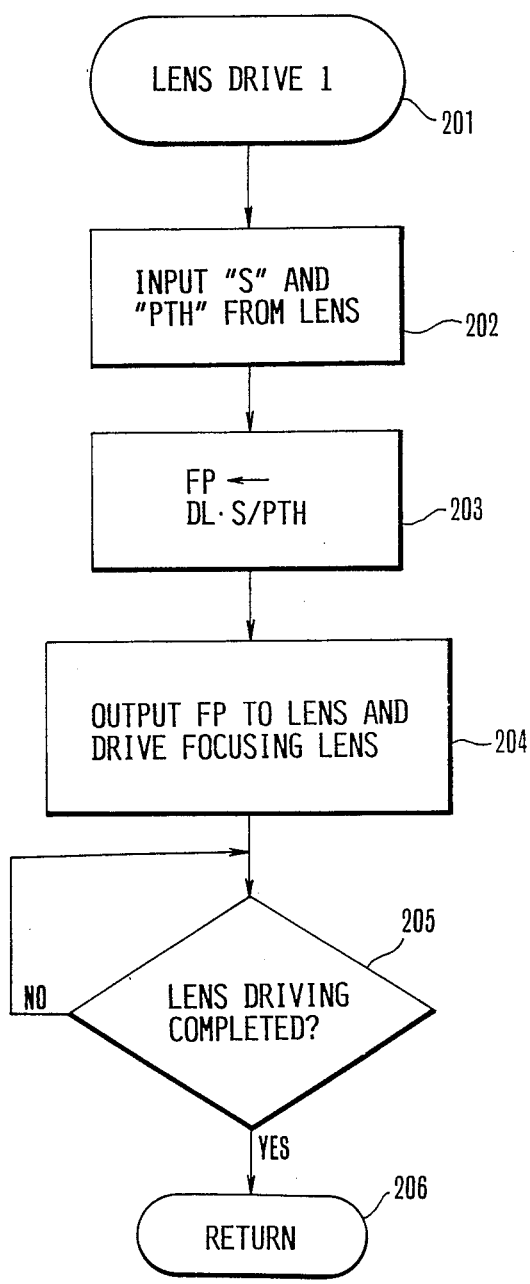
FIG. 5 is a flowchart for the lens drive 1 subroutine in FIG. 3.

In FIG. 5, there is shown a flowchart for the "lens drive 1" subroutine shown in the steps 011 and 015 of FIG. 3.

When this subroutine is executed, communication with the lens occurs in a step 202 to input two data "S" and "PTH". The "S" is the "coefficient of the defocus quantity versus the focus adjusting lens" inherent in the photographic lens. For example, in the case of the bodily-moving-type single lens, because the whole photographic lens is the focus adjusting lens, S=1. In the case of the zoom lens, the "S" varies with variation of the zooming position. The "PTH" is the amount of forward movement of the focus adjusting lens per output pulse of the encoder ENCF interlocked to the axial movement of the focus adjusting lens.

Therefore, the value obtained by reducing the forward movement of the focus adjusting lens to the number of pulses output from the encoder by the value of defocus quantity DL by which the focusing lens should be adjusted and the above-described data S and PTH, that is, a so-called lens driving amount FP, is given by the following formula:

$$FP = DL \times S/PTH$$

In a step 203, this equation is executed as it is.

In a step 204, the FP obtained in the step 203 is sent to the lens to command a driving of the focus adjusting lens (in the case of the bodily-moving-type single lens, the photographic lens as a whole).

In the next step 205, communication with the lens is made to examine whether or not the driving of the lens drive amount FP commanded in the step 204 has ended. When the driving is complete, the flow advances to a step 206 and returns the "lens drive 1" subroutine. This driving end detection is performed in such a manner that as has been described above, the lens driving amount FP is transmitted by the communication to the control circuit LPRS, then the pulse signal SENCF output from the encoder circuit ENCF in response to movement of the lens is counted by the counter in the interior of the control circuit LPRS, and then whether or not the counted value coincides with the above-described FP. The motor LMTR starts to rotate by the lens drive command and is driven by the signals LMF and LMR output from the control circuit LPRS until the coincidence is detected by the above-described step 205. When the driving by the above-described FP ends, the motor stops. This subroutine in regard to the step 011 of FIG. 3 is executed until the counter AFCNT counts "2". For the first and second focus detecting operations, the lens is driven according to the defocus quantity detected at that time point.

Figure 6:
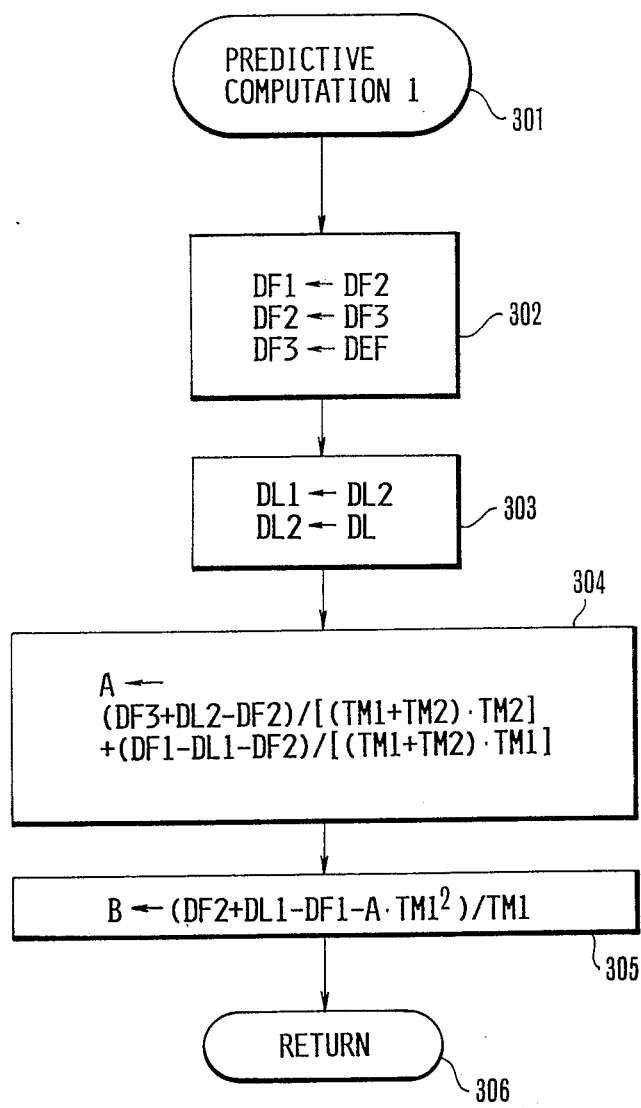
FIG. 6 is a flowchart for the predictive computation 1 subroutine in FIG. 3.

Next, in FIG. 6 there is shown a flowchart for the "predictive computation 1" subroutine. This is a flow that when there are not less than three focus detection data, the object image plane position is defined by the function f(t) based on the last three data and the coefficient of each term of this function f(t) is calculated.

At first, in a step 302, the focus detection data is renewed. The data of the memory DF2 is transferred to and stored in the memory DF1. The data of the memory DF3 is transferred to and stored in the memory DF2. Thus, each of the memories DF1 and DF2 are renewed. Then, the newest defocus quantity DFE obtained in the step 008 of FIG. 3 is stored in the memory DF3.

In a step 303, renewal of the lens drive data is performed. At first, the memory DL2 is stored in the memory DL1. Thus the memory DL1 is renewed. Then the previous lens driving amount DL is stored in the memory DL2.

By the above-described steps 302 and 303, it results that the newest value of defocus quantity is stored in the memory DF3, the value of defocus quantity obtained in the last focus detecting operation in the memory DF2, and the value of defocus quantity obtained in the before the last focus detecting operation in the memory DF1, each time the predictive computation 1 subroutine is executed. It also results that the last lens driving amount is stored in the memory DL2, and the before the last driving amount is stored in the memory DL1. In a step 304, the coefficient "a" of the quadratic term of the quadratic function f(t) for the image plane position is calculated on the basis of the equation (5) and then stored in a memory A.

Incidentally, is to the time data TM1 and TM2 in the step 304, the value defined in the step 105 of the "image signal input" subroutine of FIG. 4 is closed so that the focus detection time interval (the focus detection and lens drive period) from the before the last cycle to the last cycle is used as the data TM1, and the time interval from the last cycle to the present cycle is used as the data TM2.

It should be noted that as the data of the memory DL2 to be used in the predictive computation 1 subroutine, or the lens drive amount data of the last cycle, use is made, when the counter AFCNT=4, of the data DL obtained by the predictive computation 2 at the time of AFCNT=3, i.e., the data DL3. But, when AFCNT≧5, the data DL obtained by the lens drive 2 subroutine just before is used.

In a step 305, similarly the coefficient "b" of the linear term is calculated and stored in a memory B. After the foregoing process has been performed, the flow returns at a step 306.

Figure 7:
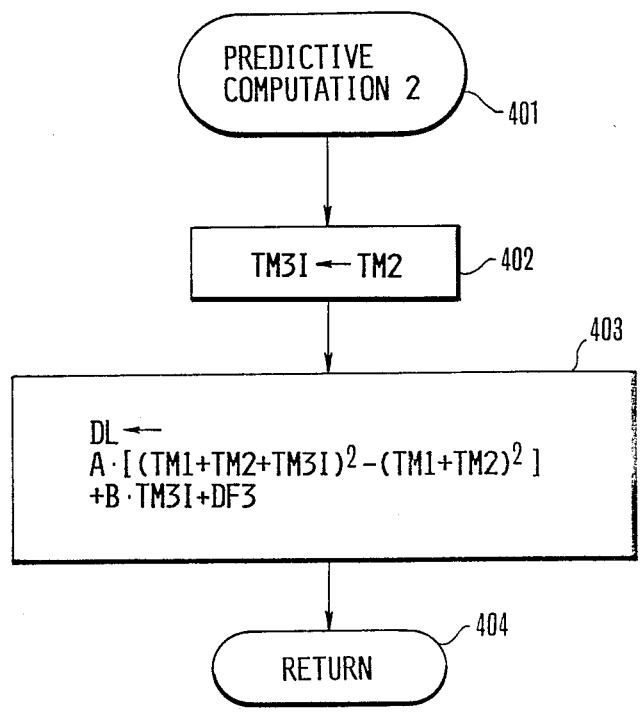
FIG. 7 is a flowchart for the predictive computation 2 subroutine in FIG. 3.

FIG. 7 is a flow of the "predictive computation 2" subroutine. This is a flow for obtaining the lens driving amount DL3 according to the function determined in the "predictive computation 1".

At first, in a step 402, the time interval TM2 of the last focus detecting operation is introduced as the predicted value TM3I of the focus detecting operation time interval from the start of the present focus detection to the end of the lens driving.

Subsequently, in a step 403, the expected amount DL3 of the next lens driving is calculated according to the equation (8), and this is stored in the memory DL. After that, the flow returns at a step 404.

Figure 8:
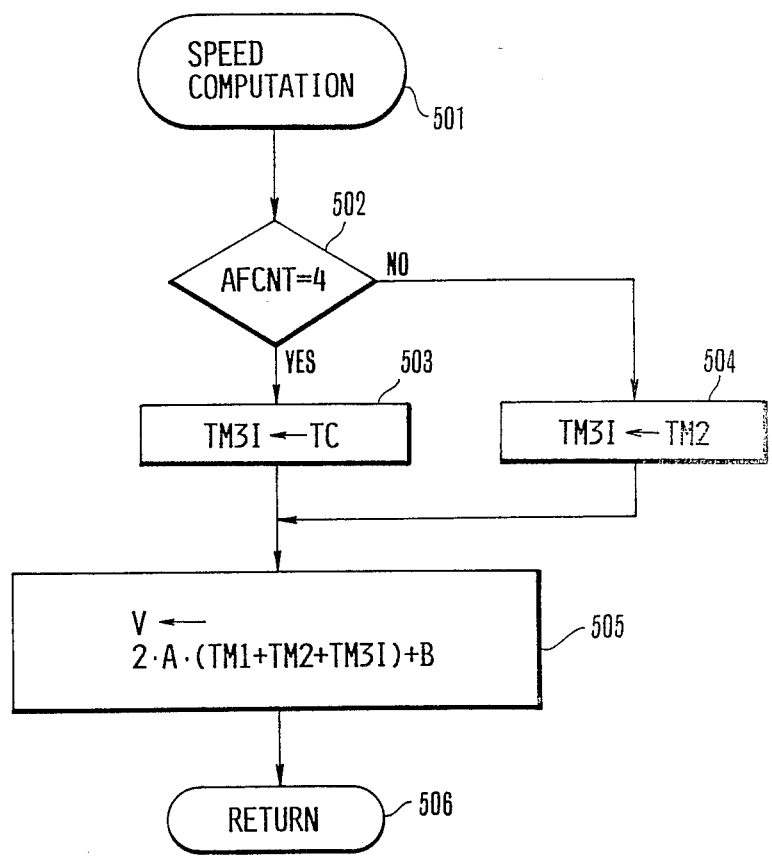
FIG. 8 is a flowchart for the speed computation subroutine in FIG. 3.

FIG. 8 is a flow of the "speed computation" subroutine. This flow is to derive the image plane moving speed function v(t) from the function f(t) determined in the "predictive computation 1" subroutine and to calculate the speed for the case where the lens is driven at the constant speed.

At first, in a step 502, the state of the counter AFCNT is sensed. In the case of AFCNT=4, as shown in FIG. 1, the last focus detection time interval TM3 and the present interval TM4 differ considerably from each other. This is because, while the time interval TM3 includes both operations of focus detection and lens drive, the present one (the fourth or later focus detecting operation) performs the focus detection and the lens drive at once, so the time interval TM4 is determined substantially only by the focus detecting operation period. Hence, when AFCNT=4, the last time is not applied to the predicted time for now, but the expected tine only for the focus detecting operation is applied to the predicted time for now. Concretely, the time interval TC is stored in the memory TM3I. Yet, this TC may be replaced by a certain constant predicted by an algorithm for focus detection of the camera, or by the value of the TC3 measured by the free-running timer function described above.

If, in the step 502, AFCNT≠4, or AFCNT=3 or AFCNT≧5, because the focus detecting periods of the last and present cycles can be regarded as almost equal to each other, the time interval TM2 of the last cycle is stored in the memory TM3I in a step 504.

In a step 505, the lens driving speed v is calculated according to the equation (13) or (14), and this is stored in a memory V. After that, the flow returns at a step 506.

Since the subroutine is defined in such a way, when the counter AFCNT=3, the lens is driven by the lens driving amount DL obtained in the predictive computation 1 and the predictive computation 2 when the lens drive 1 subroutine of the step 015 of FIG. 3 is executed. Thus the lens is driven to the predicted position.

Also, since, at this time, the speed computation subroutine is executed, the lens driving speed for the next focus detecting operation is obtained. After the lens has been driven to the above-described predicted position, the lens continues being driven at the speed determined by the speed computation subroutine in the next focus detecting operation (fourth cycle).

Figure 9:
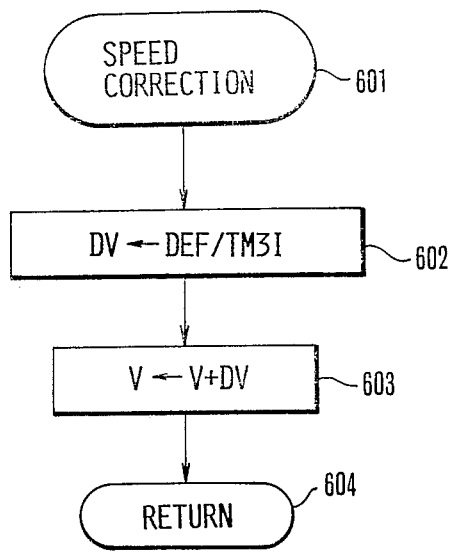
FIG. 9 is a flowchart for the speed correction subroutine in FIG. 3.

FIG. 9 is a flow of the "speed correction" subroutine. This flow is to calculate the speed correction factor that in the feedback control quantity in a case where, when the focus detection is performed while driving the lens at a constant speed, some defocus quantity is still left.

This subrouting is used to calculate the speed correction factor Δv according to the equation (15) in a step 602, and to store its result in a memory DV. Here, the equation (15) and the equation in the step 602 differ in the name of the variable from each other, because each variable is renewed in each cycle. The equation (15) and the equation of the step 602 means exactly the same operation.

In the next step 603, the above-described value of the speed correction factor DV is added to the calculated V in the step 505 of the speed computation subroutine. Thus, the corrected speed is obtained and the V is renewed to this value. Then, the flow returns at a step 604.

Figure 10:
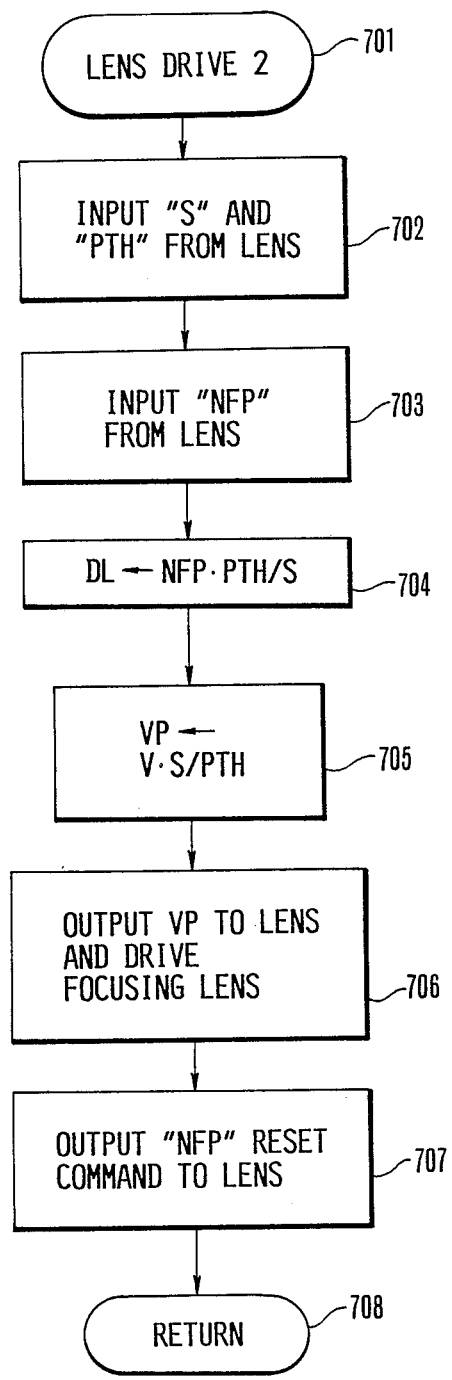
FIG. 10 is a flowchart for the lens drive 2 subroutine in FIG. 3.

FIG. 10 is a flow of the "lens drive 2" subroutine. This flow is used to move the lens at a constant-speed calculated by either the "speed computation" subroutine, or the "speed correction" subroutine that follows it.

At first, in a step 702, similarly to the step 202 of FIG. 5, the data "S" and "PTH" are input from the lens.

In a step 703, the driving amount "NFP" of the progress of constant speed driving is input from the lens. Here, NEP is a counter for counting the number of pulses in response to the lens driving in the lens. The "NFP" as will be described more fully later, is reset each time the drive command is carried out. Therefore, the "NFP" input here represents the number of drive pulses output from the moment at which the subroutine has been called in the last cycle, to the present time.

In a step 704, the driving amount NFP is reduced to a size on the image plane and then stored in the memory DL. Yet, the memory DL defined herein is not used for the driving but that data is stored because the last driving amount s necessary at the time of computation of the next cycle of predictive computation 1. As has been described above, it is used as the data of the driving amount of the last cycle when AFCNT≧5.

In a step 705, the reduced lens driving speed V (in mm/sec.) on the image plane calculated in the step 505 or 603 is translated to a pulse speed VP (in number of pulses/sec.).

In a step 706, the VP is output to the lens. While the lens continues being driven, the speed at which the lens has so far been driven is altered to the new VP.

In a step 707, a reset command for the lens "NFP" is output. Then the control circuit LPRS in the lens starts to count "NFP". After that, the flow returns at a step 708.

Figure 11:
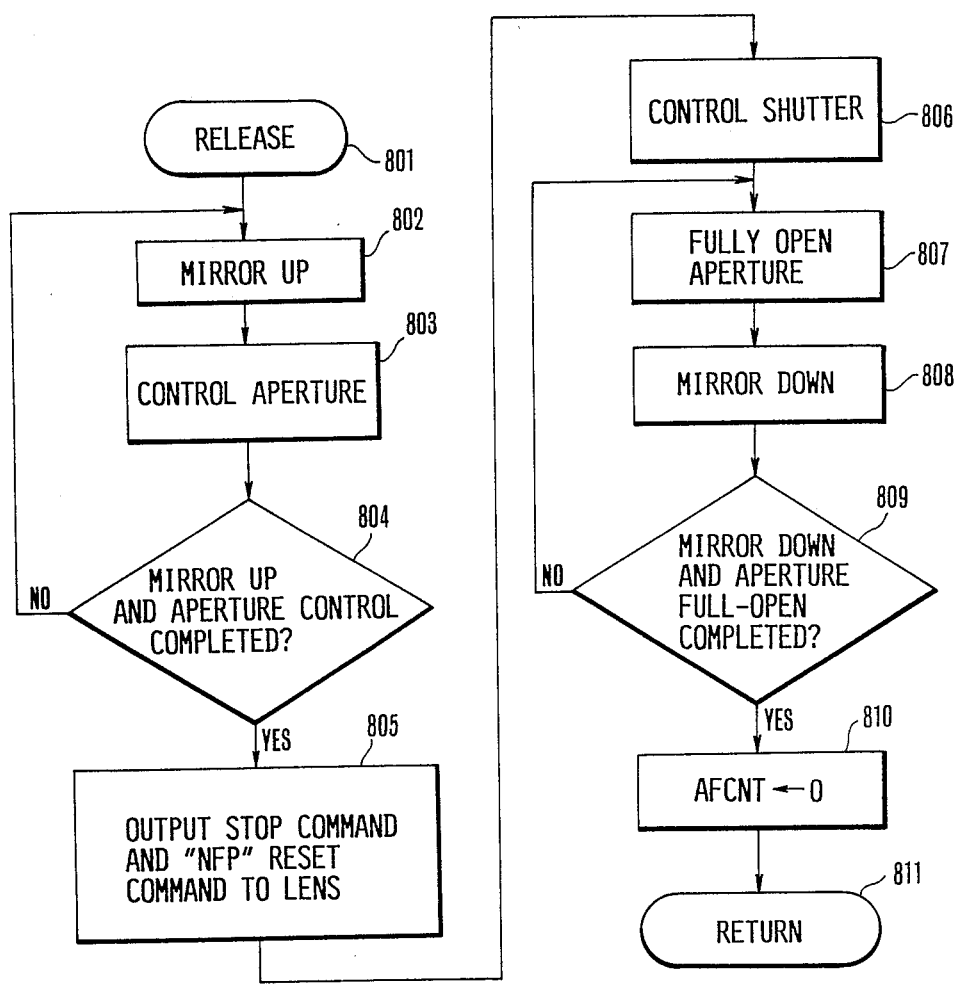
FIG. 11 is a flowchart for the release subroutine in FIG. 3.

In FIG. 11, there is shown the "release" subroutine. In a step 802, the quick-return mirror of the camera is moved upward. This is effected by controlling the motor MTR2 through the drive circuit MDR2 in accordance with the motor control signals M2F and M2R.

In the next step 803, the aperture control value already stored in the light measurement subroutine in the step 006 is sent but to the lens, causing the lens to control the aperture.

Whether or not the upward movement of the mirror and the aperture control in the steps 802 and 803 have been completed is sensed in a step 804. Yet, it takes usually several tens of milliseconds to control both. This is a main cause of the so-called release time lag.

In the step 80,, whether or not the mirror-up movement and the aperture control in the previous steps 802 and 803 have already ended is determined. The mirror-up movement can be recognized by a detection switch (not shown) associated with the mirror, while the aperture control is recognized by communication of whether or not the diaphragm has been driven to a predetermined aperture value relative to the lens. In a case where either of them is not complete yet, the flow was its in this step and continues sensing the state. When the control of both is recognized, the flow advances to a step 805. Since at the time of advance to the step 805 the lens is still being driven, a stop command is given to the lens. At the same time, the counter NFP also is reset. Thus, at this time, the preparation to the exposure has finished.

In a step 806, the shutter is controlled in accordance with the shutter control value already stored in the light measurement subroutine in the previous step 006, so that the film is exposed.

When the control of the shutter ends, the flow advances to the next step 807 where a command for fully opening the aperture is sent to the lens. Subsequently, the mirror is moved downward in a step 808. The mirror-down movement is carried out by controlling the motor MTR2, similarly to the mirror-up movement, in accordance with the motor control signals M2F and M2R.

In the next step 809, similarly to the step 804, the completion of the mirror down movement and the aperture full open control is waited for. When both the mirror down movement and the aperture full open control are complete, the flow advances to a step 810.

In the step 810, the counter AFCNT is cleared. Thus, the focus detecting operation after this release operation and the following film winding operation can start from the state of AFCNT=0. After that, the flow returns at a step 811.

The foregoing flow will now be reviewed briefly in short. In FIG. 3, for the first and second cycles of focus adjustment after the switch SW1 has turned on, the lens is driven in accordance with the value of the defocus amount DEF detected by the flow of the steps 005 to 011. In the third cycle of focus adjustment, by the flow of the steps 005 to 016, the past two focus adjustment results and the present focus detection result are used to predict the object image plane position in the third cycle and the object image plane moving speed in the fourth cycle. After the position control driving of the lens has been performed in the third cycle, the constant speed driving a the aforesaid predicted speed is carried out. And, after the fourth cycle of focus adjustment, by the flow of the steps 005–019 and 016, the speed for the next cycle is predicted, while feeding back the detected defocus quantity. Thus, the lens is driven by carrying out only the speed control.

And, in a case where the switch SW2 turns on at a time during the above-described cycle of focus adjustment, and the release interruption occurs, the release operation immediately follows. At the time point of the completion of the exposure preparation, the lens is stopped and the exposure operation is carried out.

In the release operation subroutine in FIG. 11, when the release operation starts, the focus adjustment results up to this time are all cleared, and the focus adjustment starts afresh from AFCNT=0. In the case of a series of continuous slots, in view of assuring the sharp focus in the second and later frames, because the aforesaid fresh start of the focus adjusting operation falls between the release operations, the frame rate drops so that high speed continuous shooting is impossible to perform.

Figure 12:
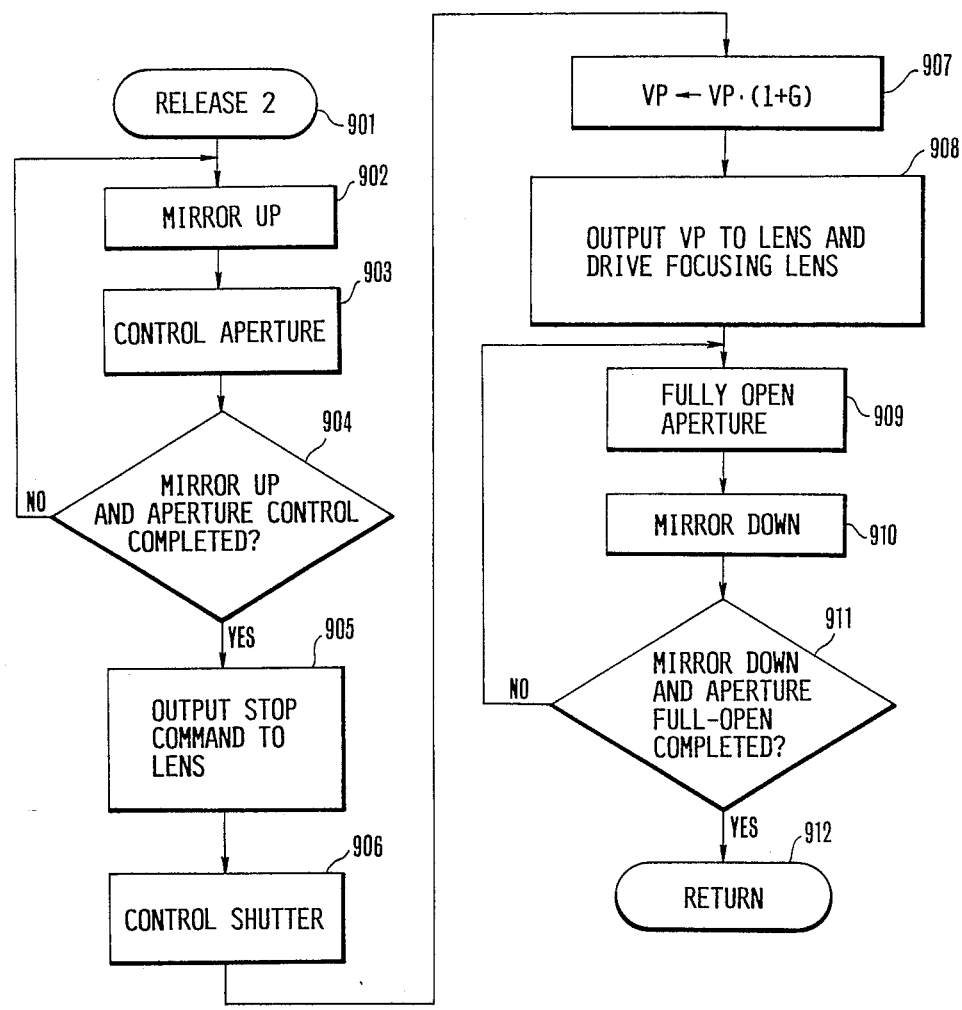
FIG. 12 is a flowchart for another example of the release subroutine.

Another release actuation subroutine shown in FIG. 12 is designed to eliminate the above-described drawback. Although the lens is stopped during the exposure, the data at the time of interruption of the lens driving is retained so that soon after one frame has been shot, a return to the predictive computation possible state can occur thus making it possible to perform continuous shooting without lowering the frame rate, while nevertheless maintaining sharp focus.

This "release 2" subroutine is explained below. At first, steps 902 to 904 are the same operations as the steps 802 to 804, whereby the mirror up movement and the closing down of the diaphragm are completed.

In a step 905, a stop command is given to the lens and the lens is stopped. But, the reset command for the NFP is not output.

After the lens has stopped, the shutter is controlled in a step 906 When the exposure has been completed, the flow advances to a step 907.

In the step 907, a preparation for correction at the restart of lens driving is carried out. In more detail, up to the step 905, the lens is driven at the speed VP. Therefore, it is expected that despite the stoppage of the lens during the exposure, the object is moving even for this time. To overcome the delay of the tracking due to the stoppage of the lens, the speed is corrected in a step 907. Here, G lies in O<G<1. It is best to vary G as a function of the lens stop time or exposure time. But it may be simplified to an appropriate constant.

In a step 908, the lens driving is started again using the new VP determined in the step 907. In steps 909 to 911, the same control as the steps 807 to 809 is carried out. Then, the flow returns at a step 912.

By using such a process, although the lens driving is stopped during the exposure operation, the termination of the exposure can be followed immediately by the start of driving again at the corrected speed by the delayed amount due to the stoppage. Moreover, because, even at the time of the aforesaid lens stoppage, the NFP is not reset, the lens drive data also are retained. After the release, the focus adjusting operation including the predictive computation can swiftly be started again. By executing the "release 2" subroutine in the step 022 of FIG. 3 as has been described above, it is made possible to perform the predictive computation soon after the release.

In the above-described embodiment, the lens driving has been performed even in the progress of the release operation. In this case, besides the many drive devices such as mirror drive motor MTR2, the diaphragm drive motor DMTR and the shutter running start magnets MG1 and MG2, even the lens drive motor LMTR is energized during the release operation. The battery of small size and small capacity usable in the camera hardly withstands the load. Therefore, there will be occasions that the correct operations of the above-described various devices cannot be assured. In such an event, it is necessary to prohibit the lens from being driven during the release operation. In this case, the predictive computation may be performed by taking into account the release time lag. In the following, a modified predictive computation and the lens drive control method by considering the release time lag are explained by using FIG. 13.

Figure 13:
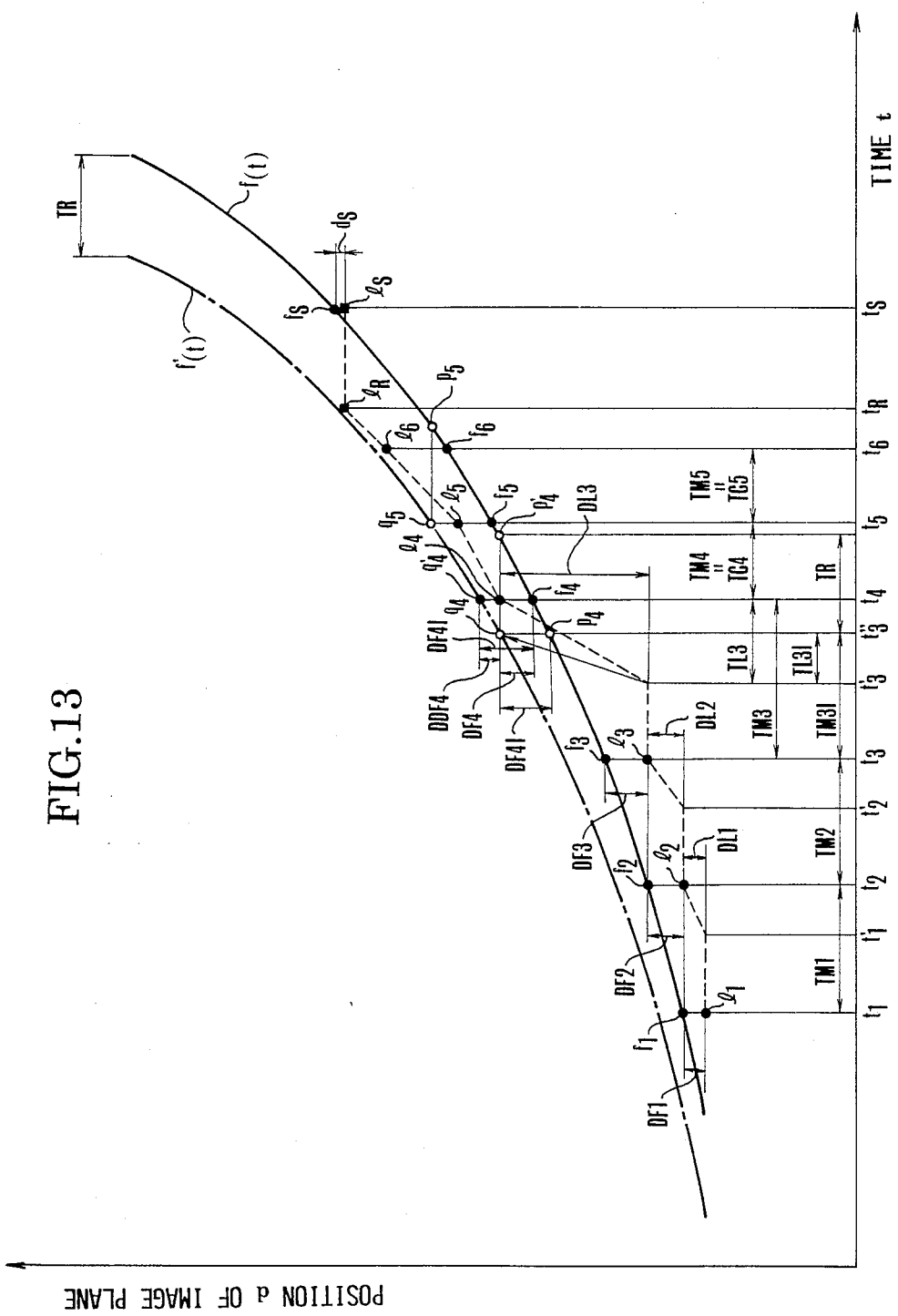
FIG. 13 is a diagram for explaining another example of the driving of the lens

In FIG. 13, features similar to those in FIG. 1 are denoted by the same symbols.

At first, similarly to the embodiment of FIG. 1, the second focus adjusting operation is carried out. That is, the first focus detecting operation is started at the time $t_1$ to obtain the defocus quantity DF1, and the lens is driven by the driving amount DL1. From the time $t_2$, the defocus quantity DF2 is likewise obtained and the lens is driven by the driving amount DL2. Subsequently, from the time $t_3$. the third focus detecting operation is started. At the time $t_3'$, the defocus computation and the predictive computation are complete. While in the case of FIG. 1 the predicted position after the end of the lens driving is the point $p_4$ at the time $t_3''$, it is in the case of FIG. 13 that because not only the lens drive expected period TL3I but also the release time lag TR must be considered, the predicted position of the image plane comes to a point $p_4'$, and the required lens drive amount becomes "DL3" in the graph. So, if the lens is driven by the driving amount DL3, it is in the ideal case that the lens will probably arrive at a point $q_4$. That is, the object image plane position on supposition by taking into account the release time lag, or the target position of the lens drive control lies on a function f'(t) obtained by moving the function f(t) on the time axis in parallel to the left by the distance TR. Hence, if the lens is driven to this position, the in-focus position is maintained in coincidence despite the stoppage of the lens at the start of the release operation.

A method of calculating the lens driving amount DL3 by which the lens is driven to the position of the function f'(t) is explained below. The function f'(t) is determined by using the past three samples of the object image plane positions $f_1$, $f_2$ and $f_3$ in exactly the same way as in the case of FIG. 1. That is, by using the DF1, DF2, DF3 and DL1, DL2, the constants, "a", "b" and "c" of the function f(t) are computed based on the formulae (5), (6) and (7).

Next, the DL3 is determined based on the formula (8). What is different here from FIG. 1 is the handling of the TT3. The TT3 is the period from the time of start of the first focus detecting operation to the termination of the lens driving of the third focus adjusting operation. In FIG. 1, it can be expressed as the equation (9):

$$TT3 = TM1 + TM2 + TM3I \qquad (9)$$

But, because, in FIG. 13 the above-defined time should be included with the release time lag TR, it becomes $$TT3 = TM1 + TM2 + TM3I + TR \qquad (17)$$

Thus, instead of using the equation (9), the equation (17) is used in replacement of the TT3 in the equation (8) to obtain $$DL3 = a((TM1 + TM2 + TM3I + TR)^2 - (TM1 + TM2)^2) \qquad (18)$$
$$+ b(TM3I + TR) + DF3$$

Now, after the lens has ideally arrived at the point $q_4$, it is necessary to drive the lens at a constant speed determined by the gradient of the function f'(t) at the point $q_4$. Here, the value of the gradient at the point $q_4$ of the function f'(t) is equal to the value of the gradient at the point $p_4'$ of the function f(t). This value is obtained by substituting the equation (17) for the TT3 of the equation (13). That is, from he time $t_3''$ onward, the constant speed driving is performed at :he speed determined by the following equation:

$$v(t_3'') = 2a(TM1 + TM2 + TM3I + TR) + b \qquad (19)$$

The foregoing discussion is valid in the ideal case where the required time for the lens driving amount DL3 coincides with the expected value TL3I. In actual practice, however it will happen that because of a large value of the driving amount DL3, it takes a longer time TL3 than the expected time TL3I to complete the driving of the lens at the time $t_4$. At this time, the object image plane position is at $f_4$, while the lens position is at $l_4$. And the lens is driven at the speed calculated from the point $t_4$ by the equation (19). In the ideal case, at the start of the fourth cycle of focus detection, the object image plane position lies at the point $p_4$ and the lens position lies at the point $q_4$, so that the defocus quantity observed at this time is $q_4 - p_4 = DF4I$. The actually observed defocus quantity is, on the other hand, $l_4 - f_4 = DF4$. Meanwhile, the idea defocus quantity at the time $t_4$ is $q_4' - f_4$. This is almost equal to the DF4I. (The time spaces between any two of the points $p_4$, $p_4'$, $q_4'$, and $q_4$ are very short and, therefore, the image plane moving speed at these points are almost equal to one another. Hence, a figure enclosed by the four points may be regarded as a parallelogram.) Therefore, the amount of deviation of the $l_4$ from f'(t) at the time $t_4$ becomes $$DF4I - DF4 = DDF4 \qquad (20)$$

Based on this amount of deviation, the feedback for the speed after the time $t_5$ should be performed.

A method of speed computation and feedback in the fourth focus detecting operation starting at the time $t_4$ is explained below.

At first, from the data of $f_2$, $f_3$ and $f_4$, the target speed at a time $t_5$ is computed. Concretely speaking, from the DF2, DF3, DF4 and DL2, DL3, the "a" and "b" are determined based on the formulae (5) and (16). The target speed at the time $t_5$ is the gradient at the point $q_5$ on the curve f'(t). This is equal to the gradient at the point $p_5$ on the function f(t). Hence, the speed at the point $p_5$ is determined likewise as in determining the speed of the point $p_4$ by substituting "TT3" defined by the equation (17) for "TT3" of the speed equation (13). Here, this TT3, if the numerical values shown in FIG. 3 are used becomes $$TT3 = TM2 + TM3 + TM4 + TR \qquad (21)$$

so that the equation (13) takes the following form:

$$v_5 = 2a(TM2 + TM3 + TM4 + TR) + b \qquad (22)$$

Next, an explanation will be given to the method of feedback using the amount of deviation DDF4. DDF4 can be expressed like the equation (18) by $$DDF4 = DF4I - DF4 \qquad (23)$$

Here, DF4I is expressed by $$DF4I \approx (\text{Speed at } P_4) \times TR \qquad (24)$$

The speed at the point $p_4$ is calculated by the equation (19), where the "a" and "b" have the previous values, or the values computed from the $f_1$, $f_2$ and $f_3$ in the previous cycle are applied thereto. Therefore, the equation (23) becomes $$DDF4 = v(t_3'') \cdot TR - DF4 \qquad (25)$$

Therefore, the amount of feedback corresponding to the equation (15) is $$\Delta v_4 = DDF4/TC5 \qquad (26)$$

The final speed $v_5'$ is $$\begin{aligned} v_5' &= v_5 + \Delta v_4 \\ &= 2a(TM2 + TM3 + TM4 + TR) + b + \\ &\quad v(t_3'') \cdot (TR/TC5) - (DF4/TC5) \end{aligned} \qquad (23)$$

Therefore, after the time $t_5$, the constant speed driving of the lens should be performed according to this speed $v_5'$. Even after the time $t_5$, the focus detection, the speed calculation and speed feedback are likewise carried out. By their results, at a time $t_6$, a new value of the speed is used in the drive control.

Now, when the release start signal is produced at the time $t_R$, the lens is immediately stopped in the position of the point $l_R$ and the release operation of the camera is started, and, in the release time lag TR, or at the time $t_S$, the shutter curtain runs to initiate an exposure. Since, at this time, the lens lies at the point $l_S$ and the object image plane lies at the point $f_S$, the defocus quantity of the taken photograph becomes $d_S$. Thus, the focus error is almost removed.

A flowchart for the above-described lens drive of FIG. 13 is explained by reference to FIG. 14 and those that follow.

At first, the lens driving of FIG. 13 is different from the lens driving of FIG. 1 only in the steps 013, 014, 018, 019 of the flowchart of FIG. 3. Therefore, these alone are explained in order. The same flow as that of FIG. 3 is not further explained.

Figure 14:
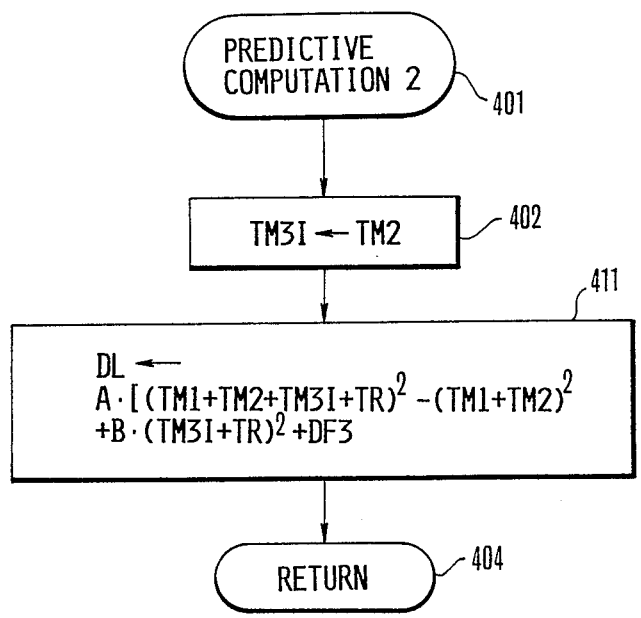
FIG. 14, FIG. 15 and FIG. 16 are flowcharts for subroutines of driving the lens according to the principle shown in FIG. 13.

FIG. 14 is a "predictive computation 2" subroutine corresponding to the step 013 of FIG. 3 and FIG. 7, where what is different from FIG. 7 is only a step 411 corresponding t', the step 403.

The step 411 is to calculate the expected amount of lens driving according to the A and B calculated by the "predictive computation 1" subroutine and the equation (18). It has a form as derived from the step 403 by adding the term of "TR".

Figure 15:
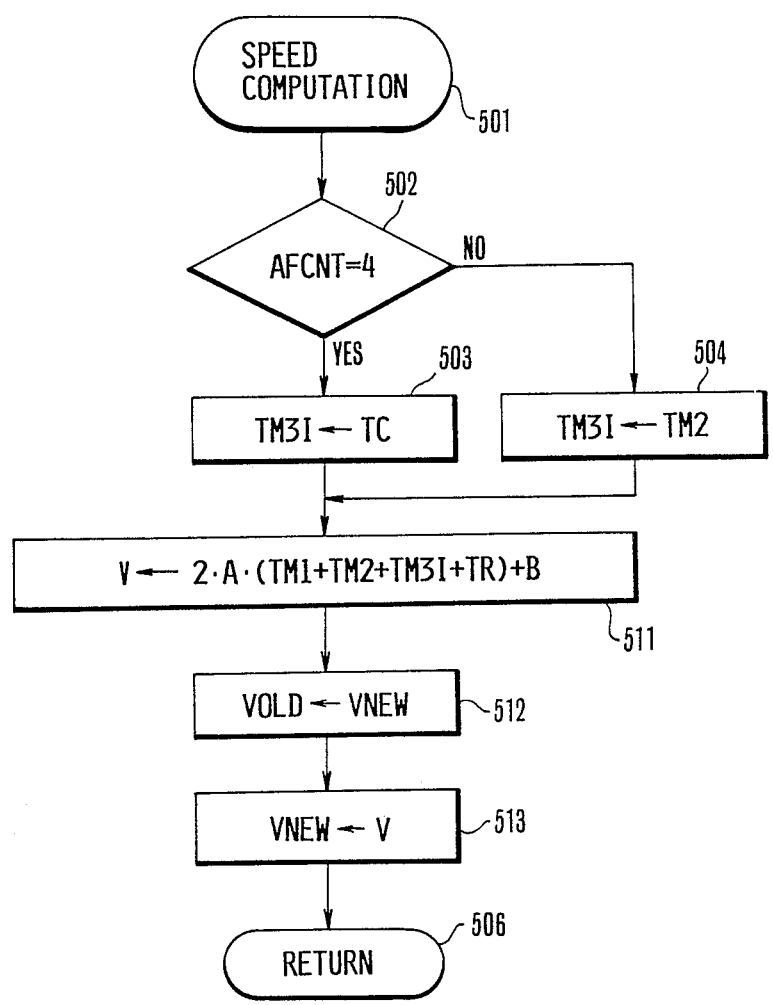

FIG. 15 is a "speed computation" subroutine corresponding to the steps 014 and 018 of FIG. 3 and FIG. 8. What is different from FIG. 8 is a step 511 corresponding to the step 505.

The step 511 also, similarly to the step 411, is used to calculate the speed V by using the A and B and according to the equation (19). And, the step 511 has a form as derived from the step 505 by adding "TR".

In the next step 512, the calculated value of the speed is renewed. Here, VOLD represents the previous calculated value of speed, and VNEW the present calculated value of speed. Since at the time of execution of the step 512, the value of speed calculated in the previous focus detecting operation is stored in a memory VNEW, this value is first transferred to and stored in a memory VOLD.

In the next step 513, the value of speed V calculated in the step 511 is stored in the VNEW. Thus, the VNEW is renewed. That is, at this time point, the previous and present values are put into the memories VOLD and VNEW respectively.

Figure 16:
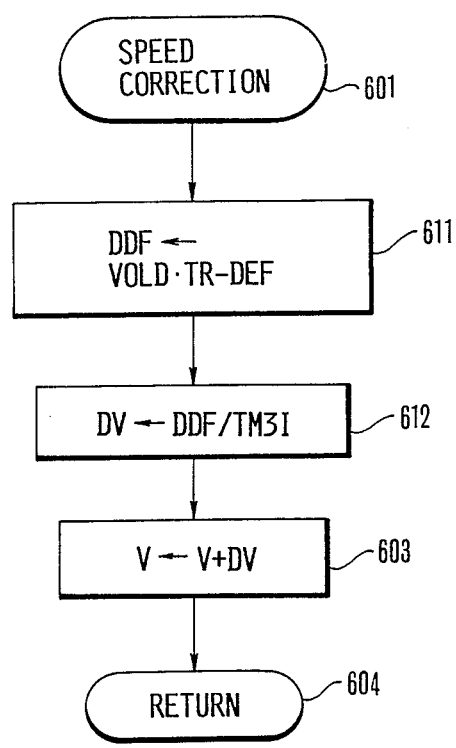

FIG. 16 is a "speed correction" subroutine corresponding to the step 019 of FIG. 3 and FIG. 9. Instead of the step 609 of FIG. 9, steps 611 and 612 are inserted.

In the step 61, the discrepancy DDF of the lens from the target object image plane position f'(t) is calculated according to the equation (25). Since the v(t₃″) of the equation (25) is the previous calculated value of speed, the renewed VOLD in the step 512 is used.

In the step 612, the feedback amount DV of the speed is calculated according to the equation (26). Then, in the step 603, V+DV→V is computed. Then the flow returns at the step 604.

By the foregoing flow, the lens driving shown in FIG. 13 is accomplished.

Though, in each of the above-described embodiments, the object image plane position has been fixed by the quadratic function, it is of course possible to replace it by any other function, for example, a linear function, or a function of third or higher degree.

Also, though the focus detecting device in the present embodiment has been assumed to employ the focus detecting method of the type in which the defocus quantity of the photographic lens is detected, or the TTL type, it is to be understood that the invention is applicable to other types of focus detecting devices having an independent optical system of the photographic lens, or so-called external trigonometric survey type or the active type using infrared light as the sweeping light.

Further, since the lens drive method of the FIG. 1 embodiment enables an image will sharp focus to be obtained while being observed through the finder of the camera the invention is applicable not only to still cameras but also to the video cameras.

What is claimed is:

1. An autofocus device, of a camera equipped with the autofocus device, having a focus detecting circuit for repeatedly detecting focus, in which an image forming optical system is driven on the basis of a focusing quantity detected by the focus detecting circuit, comprising:
   an optical system position controlling circuit in which data based on the focusing quantity detected by the focus detecting circuit are set to move the optical system to a position corresponding to the set data;
   a speed computing circuit for computing a speed of movement of an image plane corresponding to movement of an object on the basis of a past autofocusing operation data;
   a speed control circuit for controlling a driving speed of the image forming optical system on the basis of the speed obtained by said speed computing circuit; and
   mode selection means for selecting a first mode for driving the optical system using said position controlling circuit without actuating said speed control circuit, and a second mode for driving the optical system using said speed control circuit without actuating said position controlling circuit.

2. An autofocus device or a camera according to claim 1, wherein said speed computing circuit computes data relating to a movement position of the image plane on the basis of the past autofocusing operation data and computes a speed of movement of the image plane from said data relating to a movement position of the image plane.

3. An autofocus device or a camera according to claim 1, wherein said data relating to a movement position of the image plane is a function indicative of displacement of a movement position of the image plane.

4. An autofocus device or a camera according to claim 1, wherein said autofocusing operation data is the focusing quantity detected by the focus detecting circuit.

5. An autofocus device or a camera according to claim 1, wherein said speed computing circuit computes a speed of movement of the image plane each time the focus detecting circuit detects focus.

6. An autofocus device, or a camera equipped with the autofocus device, having a focus detecting circuit for repeatedly detecting focus, in which an image forming optical system is driven on the basis of a focusing quantity detected by the focus detecting circuit, comprising:
   (a) a speed computing circuit for computing a speed of movement of an image plane corresponding to movement of an object on the basis of past autofocusing operation data;
   (b) a drive data computing circuit for predictive-computing data relating to a drive position of the image forming optical system in consideration of movement of the object on the basis of the past autofocusing operation data;
   (c) a speed control circuit for controlling a driving speed of the image forming optical system on the basis of the speed obtained by said speed computing circuit;
   (d) a drive circuit for driving the image forming optical system, said drive circuit operating in one of a first mode in which a drive position of the optical system is controlled in accordance with the data obtained by said drive data computing circuit without actuating said speed control circuit, and a second mode in which a driving speed of the optical system is controlled by said speed control circuit without actuating the drive position of the optical system using said drive data computing circuit; and
   (e) a selection circuit for selecting one of said first and said second modes.

7. An autofocus device or a camera according to claim 6, wherein said speed computing circuit computes data relating to a movement position of the image plane on the basis of the past autofocusing operation data and computes a speed of movement of the image plane from said data relating to a movement position of the image plane.

8. An autofocus device or a camera according to claim 6, wherein said data relating to a movement position of the image plane is a function indicative of displacement of a movement position of the image plane.

9. An autofocus device or a camera according to claim 6, wherein said autofocusing operation data is the focusing quantity detected by said focus detecting circuit.

* * * * *

UNITED STATES PATENT AND TRADEMARK OFFICE
CERTIFICATE OF CORRECTION

PATENT NO. : 4,969,003

DATED : November 6, 1990

INVENTOR(S) : Ichiro Ohnuki, et al.

It is certified that error appears in the above-identified patent and that said Letters Patent is hereby corrected as shown below:

COLUMN 1,
    Line 7, "camera; or" should read --cameras or--;
    Line 26, "change's," should read --changes,--; and
    Line 36, "be" should read --by--.

COLUMN 2,
    Line 6, "invention to" should read --invention is to--.

COLUMN 3,
    Line 13, "teen" should read --been--;
    Line 31, "time it" should read --time ti--; and
    Line 39, "ti" should read --$\ell$i--.

COLUMN 5,
    Line 21, "somewhat tracking" should read --somewhat of a tracking--; and
    Line 24, "Next" should read --Next,--.

COLUMN 6:
    Line 6, "function l(t)" should read --function f(t)--;
    Line 25, "rust" should read --must--;
    Line 49, "first cycle" should read --a first cycle--;
    Line 54, "time $t_2$." should read --time $t_2$,--; and
    Line 62, "1 he" should read --the--.

COLUMN 7,
    Line 10, delete "on" (first occurrence).

COLUMN 8,
    Line 18, "computer P(S," should read --computer PRS--;
    Line 26, "item" should read --its--; and
    Line 50, "automatic gain control AGC" should read --automatic gain control (AGC)--.

UNITED STATES PATENT AND TRADEMARK OFFICE
CERTIFICATE OF CORRECTION

PATENT NO. : 4,969,003

DATED : November 6, 1990

INVENTOR(S) : Ichiro Ohnuki, et al.

It is certified that error appears in the above-identified patent and that said Letters Patent is hereby corrected as shown below:

COLUMN 9,
    Line 15, "a&" should read --at--;
    Line 45, "cf" should read --of--; and
    Line 61, "encoder circuit INCF." should read --encoder circuit ENCF.--.

COLUMN 10,
    Line 41, "stops 002 to 004" should read --steps 002 to 004--;
    Line 45, "row" should read --now--; and
    Line 61, "in" should read --an--.

COLUMN 11,
    Line 65, "publicly," should read --publicly--.

COLUMN 12,
    Line 5, "succeeds" should read --succeeds.--;
    Line 35, "above" should read --above,--;
    Line 47, "fill" should read --film--;
    Line 58, "part" should read --past--; and
    Line 68, "is" should read --in--.

COLUMN 13,
    Line 5, "last but one" should read --before-the-last--;
    Line 10, "before the" should read --before-the- --;
    Line 27, "seeds" should read --sends--;
    Line 48, "is" (second occurrence), should read --as--;
    Line 66, "change:" should read --changes--; and
    Line 67, "an<" should read --and--.

UNITED STATES PATENT AND TRADEMARK OFFICE
CERTIFICATE OF CORRECTION

PATENT NO. : 4,969,003

DATED : November 6, 1990

INVENTOR(S) : Ichiro Ohnuki, et al.

It is certified that error appears in the above-identified patent and that said Letters Patent is hereby corrected as shown below:

COLUMN 14,
    Line 11, "given" should read --gives--;
    Line 18, "signal A/S" should read --signal AOS--;
    Line 20, "synchronise" should read --synchronism--;
    Line 24, "blow" should read --flow--; and
    Line 33, "before the last" should read --before-the-last--.

COLUMN 15,
    Line 47, "before the last" should read --before-the-last--;
    Line 53, "is" should read --as--; and
    Line 57, "before the last" should read --before-the-last--.

COLUMN 16,
    Last line, "in" (first occurrence) should read --is--.

COLUMN 17,
    Line 37, "s" should read --is--;
    Line 59, "but" should read --out--; and
    Line 66, "step 80,," should read --step 804,--.

COLUMN 18,
    Line 7, "was its" should read --waits--;
    Line 36, "briefly in" should read --briefly.--;
    Line 37, delete "short."; and
    Line 48, "a" should read --at--.

UNITED STATES PATENT AND TRADEMARK OFFICE
CERTIFICATE OF CORRECTION

PATENT NO. : 4,969,003          Page 4 of 4

DATED      : November 6, 1990

INVENTOR(S) : Ichiro Ohnuki, et al.

It is certified that error appears in the above-identified patent and that said Letters Patent is hereby corrected as shown below:

<u>COLUMN 20</u>,
Line 6, "time $t_3$." should read --time $t_3$,--;
Line 54, "+" should read --+b(TM3I+TR)+$DF_3$--;
Line 55 should be deleted; and
Line 65, ":he" should read --the--.

<u>COLUMN 21</u>,
Line 10, "$t_4$" should read --$\ell_4$.--;
Line 11, "point $t_4$" should read --point $\ell_4$.--; and
Line 17, "idea" should read --ideal--.

<u>COLUMN 22</u>,
Line 41, "t'," should read --to--.

<u>COLUMN 23</u>,
Line 4, "step 61," should read --step 611,--; and
Line 36, "of" should read --or--.

Signed and Sealed this

Fourteenth Day of July, 1992

Attest:

DOUGLAS B. COMER

Attesting Officer         Acting Commissioner of Patents and Trademarks